(12) United States Patent
Michaeli et al.

(10) Patent No.: US 11,270,334 B2
(45) Date of Patent: Mar. 8, 2022

(54) SYSTEMS AND METHODS FOR GENERATING ADJUSTMENT(S) FOR DISTRIBUTING CONTENT VARIATIONS TO TARGET ENTITIES FOR PERFORMANCE OF AN ASSOCIATED ACTION

(71) Applicant: Dynamic Yield Ltd., Tel-Aviv (IL)

(72) Inventors: Idan Michaeli, RaAnana (IL); Omri Mendellevich, Tel-Aviv (IL)

(73) Assignee: Dynamic Yield Ltd., Tel-Aviv (IL)

( * ) Notice: Subject to any disclaimer, the term of this patent is extended or adjusted under 35 U.S.C. 154(b) by 363 days.

(21) Appl. No.: 15/690,584

(22) Filed: Aug. 30, 2017

(65) Prior Publication Data

US 2019/0066151 A1 Feb. 28, 2019

(51) Int. Cl.
| | | |
|---|---|---|
| G06Q 30/00 | (2012.01) | |
| G06Q 30/02 | (2012.01) | |
| G06F 3/16 | (2006.01) | |
| G06F 16/958 | (2019.01) | |
| G06F 40/30 | (2020.01) | |

(52) U.S. Cl.
CPC ......... *G06Q 30/0244* (2013.01); *G06F 3/167* (2013.01); *G06F 16/958* (2019.01); *G06F 40/30* (2020.01); *G06Q 30/0254* (2013.01)

(58) Field of Classification Search
None
See application file for complete search history.

(56) References Cited

U.S. PATENT DOCUMENTS

| | | | | |
|---|---|---|---|---|
| 5,991,735 A | * | 11/1999 | Gerace | G06Q 30/02 705/7.29 |
| 2007/0260520 A1 | * | 11/2007 | Jha | G06Q 30/02 705/14.44 |
| 2008/0228571 A1 | * | 9/2008 | Koran | G06Q 30/02 705/14.43 |
| 2010/0050201 A1 | * | 2/2010 | Kubota | G06Q 30/02 725/12 |
| 2012/0150626 A1 | * | 6/2012 | Zhang | G06Q 30/0241 705/14.42 |
| 2013/0024283 A1 | * | 1/2013 | Axe | G06Q 30/02 705/14.54 |

(Continued)

*Primary Examiner* — Kambiz Abdi
*Assistant Examiner* — Christopher Stroud

(57) ABSTRACT

There is provided a method of calculating a set of sequential adjustments, comprising: designating content variations to clusters of target entities that are compliant with defined target entity feature(s) according to a set of decision rule(s), calculating performance outcome(s) based on an analysis of data collected from execution of the decision rule(s), calculating sequential adjustment(s) of the decision rule(s), according to an analysis of a predicted performance outcome calculated based on assigning content variation(s) to respective target entities according to an adjusted set of decision rules, and wherein each sequential adjustment includes alternative decision rule(s) designating content variation(s) to a respective cluster of target entities that are compliant with entity feature(s), and presenting the sequential adjustment(s) including the target entity feature(s) with which the cluster of target entities is compliant, and alternative decision rule(s) including content variation(s) designated to respective clusters of target entities.

31 Claims, 9 Drawing Sheets

(56) References Cited

U.S. PATENT DOCUMENTS

| | | | |
|---|---|---|---|
| 2015/0286728 A1* | 10/2015 | Kruglick | G06F 16/9535 |
| | | | 707/737 |
| 2016/0343026 A1* | 11/2016 | Cheng | G06Q 30/0244 |
| 2017/0255971 A1* | 9/2017 | Box | G06Q 30/0273 |
| 2017/0293944 A1* | 10/2017 | Garg | G06Q 30/0277 |

* cited by examiner

FIG. 3

SYSTEMS AND METHODS FOR GENERATING ADJUSTMENT(S) FOR DISTRIBUTING CONTENT VARIATIONS TO TARGET ENTITIES FOR PERFORMANCE OF AN ASSOCIATED ACTION

FIELD AND BACKGROUND OF THE INVENTION

The present invention, in some embodiments thereof, relates to systems and methods for distribution of content and, more specifically, but not exclusively, to systems and methods for recommending a cluster of target entities to assign to a certain content variation.

Randomization may be performed to determine whether a content variation, for example to a website, affects behavior of a user accessing the website. A currently used version of the website may be compared to a modified version of the website to determine whether the user behavior is different for the modified version relative to the current version, for example, whether the user is more likely to click a link on the modified version than on the current version.

SUMMARY OF THE INVENTION

According to a first aspect, a computer implemented method of calculating a set of sequential adjustments of decision rules designating content variations to target entities, comprises: executing a code by at least one hardware processor of a computing device, for: receiving, via a network, from a client terminal, a set of at least one decision rule, designating each of a plurality of content variations to a respective cluster of target entities that are compliant with at least one defined target entity feature according to the set of at least one decision rule, calculating at least one performance outcome based on an analysis of data collected from execution of the at least received one decision rule, calculating at least one sequential adjustment of the received set of at least one decision rule, wherein the sequential adjustment is based on at least one target entity feature, and wherein each sequential adjustment is computed according to an analysis of a predicted performance outcome calculated based on assigning at least one of the plurality of content variations to respective target entities according to an adjusted set of decision rules, and wherein each sequential adjustment includes at least one alternative decision rule designating at least one content variation to a respective cluster of target entities that are compliant with at least one entity feature, and presenting, within a UI of the client terminal, the at least one sequential adjustment, wherein the presented at least one sequential adjustment includes the at least one target entity feature with which the cluster of target entities defined by the at least one sequential adjustment is compliant, and at least one alternative decision rule including at least one content variation designated to respective clusters of target entities.

According to a second aspect, a system for calculating a set of sequential adjustments of decision rules designating content variations to target entities, comprises: a non-transitory memory having stored thereon a code for execution by at least one hardware processor of a computing device, the code comprising: code for receiving, via a network, from a client terminal, a set of at least one decision rule, code for designating each of a plurality of content variations to a respective cluster of target entities that are compliant with at least one defined target entity feature according to the set of at least one decision rule, code for calculating at least one performance outcome based on an analysis of data collected from execution of the at least received one decision rule, code for calculating at least one sequential adjustment of the received set of at least one decision rule, wherein the sequential adjustment is based on at least one target entity feature, and wherein each sequential adjustment is computed according to an analysis of a predicted performance outcome calculated based on assigning at least one of the plurality of content variations to respective target entities according to an adjusted set of decision rules, and wherein each sequential adjustment includes at least one alternative decision rule designating at least one content variation to a respective cluster of target entities that are compliant with at least one entity feature, and code for presenting, within a UI of the client terminal, the at least one sequential adjustment, wherein the presented at least one sequential adjustment includes the at least one target entity feature with which the cluster of target entities defined by the at least one sequential adjustment is compliant, and at least one alternative decision rule including at least one content variation designated to respective clusters of target entities.

According to a third aspect, a computer program product for calculating a set of sequential adjustments of decision rules designating content variations to target entities, comprises: instructions for receiving, via a network, from a client terminal, a set of at least one decision rule, instructions for designating each of a plurality of content variations to a respective cluster of target entities that are compliant with at least one defined target entity feature according to the set of at least one decision rule, instructions for calculating at least one performance outcome based on an analysis of data collected from execution of the at least received one decision rule, instructions for calculating at least one sequential adjustment of the received set of at least one decision rule, wherein the sequential adjustment is based on at least one target entity feature, and wherein each sequential adjustment is computed according to an analysis of a predicted performance outcome calculated based on assigning at least one of the plurality of content variations to respective target entities according to an adjusted set of decision rules, and wherein each sequential adjustment includes at least one alternative decision rule designating at least one content variation to a respective cluster of target entities that are compliant with at least one entity feature, and instructions for presenting, within a UI of the client terminal, the at least one sequential adjustment, wherein the presented at least one sequential adjustment includes the at least one target entity feature with which the cluster of target entities defined by the at least one sequential adjustment is compliant, and at least one alternative decision rule including at least one content variation designated to respective clusters of target entities.

The systems and/or methods (e.g., implemented as code instructions stored in a data storage device executed by processor(s) described herein present a technical solution to the technical problem of analyzing real time performance data collected for evaluating two or more content variations (e.g., variations of a user interface) to determine which content variation results in a higher probability of a target entity performing an action, where the target entity is defined according to one or more target entity features. The evaluation may be conducted in a network environment, in which target entities using client terminals access over a network a server hosting the content variations (e.g., a web site) being evaluated. The real timer performance data may include a large amount of data, which may be difficult and time consuming to analyze to discover relevant and/or statistically significant scenarios to implement when the number of combinations of values of features of the target entities is very larger.

Significant computational resources, storage resources, and/or time to analyze are required. The technical solution proposed herein automatically analyzes the data to select a small sequential set of recommendations (e.g., 1-5, or 2, or 3 or other numbers) which are presented within a UI optionally using natural language, which is easy to understand. For example, for N content variations (e.g., user interface variations), and K categorical features of target entities, where each i-th categorical feature includes $V\_i$ different possible values, the number of possible content variations to provide to all target entities is denoted as $2^N$. The number of possible feature combinations based on target entity feature vectors is denoted as FV= $V\_1 \times V\_2 \ldots \times V\_k$, where $2^{(FN)}$ ways to select which cluster of target entities to assign to a first content variation, and the rest of the target entities are assigned to a second content variation. Before removing redundant symmetries, there are $2^{(2N+V\_1 \times V2 \times \ldots \times V\_k)}$ possible feature combinations, which rapidly increases to a very large number, which make it difficult to identify the best combination(s) in a reasonable amount of time using reasonably available computational resources. Taking advantage of symmetries may reduce the number by about 4, which still makes it difficult to identify the best feature combination(s) in a reasonable amount of time using reasonably available computational resources.

The systems and/or methods described herein identify the best feature combination(s) within a reasonable amount of time using reasonably available computational resources by reducing the number of possible combinations to $FV \times N$, by considering the cases of assigning target entities having certain value(s) for features to a certain content variation. When the other target entities (having other value(s) of features) are assigned to another content variation, the number of possible combinations is still manageable, at $FV \times N \times N$.

The systems and/or methods (e.g., implemented as code instructions stored in a data storage device executed by one or more processors) described herein improve the performance of a server that performs the trial, analyzes the real time performance data, and/or generates the recommendations, by reducing the computational resources (e.g., processor utilization), storage device resources, and/or processing time for performing the trial, analyzing the real time performance data, and/or generating the recommendations. The improvement may be, for example, relative to brute force methods that analyze all (or a large number of) possible combination.

The systems and/or methods (e.g., implemented as code instructions stored in a data storage device executed by one or more processors) described herein improve the performance of a screen of the client terminal of a user conducting the trial, by reducing the requirements for presenting the generated recommendations. The recommendations, optionally natural language recommendations, may be presented as text, which may be displayed compactly on small screens (e.g., smartphone, watch computer, glasses computer), and/or using a small surface on a display presenting other data (e.g., within a small window, as a message presented on the border of the display). In fact, the recommendations may be presented without a screen at all, for example, using audio, which may be played back as a phone call to a phone, or using a microphone of a computer.

Moreover, the recommendations improve the ability of disabled users to use the client terminal, by presenting the recommendations to blind users (e.g., using Braille) and/or to deaf users (e.g., using Sign Language presented on the screen). The top recommendations (e.g., top 3-5) may be selected and presented, which may appear simultaneously on the display using the available space of the display within the GUI, rather than, for example, presenting a large number of recommendations and/or a large dataset which may require the user to shift between multiple screens in order to view the presented data.

In a further implementation form of the first, second, and third aspects, the method further comprises and/or the system further includes code for and/or the computer program product includes additional instructions for computing each sequential adjustment of a sequentially increasing number of adjustments based on the previously computed set of adjusted at least one decision rule, wherein each sequential adjustment includes a sequentially increasing number of additional at least one target entity features with which the cluster of target entities is compliant, and another alternative decision rule.

In a further implementation form of the first, second, and third aspects, the predicted performance outcome is computed according to an analysis of the probability of the respective target entity defined by the set of at least one decision rule performing an action associated by the content variation of the set of the at least one decision rule.

In a further implementation form of the first, second, and third aspects, the at least one performance outcome is computed according to whether or not members of the cluster of target entities performed an action associated with the designated content variation.

In a further implementation form of the first, second, and third aspects, each at least one sequential adjustment is associated with at least one possible content variation for designation to the cluster of target entities.

In a further implementation form of the first, second, and third aspects, each at least one sequential adjustment further comprises an additional subset of content variations for designation to target entities that are excluded from the cluster.

In a further implementation form of the first, second, and third aspects, a single content variation is randomly selected according to a probability distribution from the plurality of content variations for designation to each member of the cluster of target entities.

In a further implementation form of the first, second, and third aspects, the at least one sequential adjustment is presented as at least one natural language recommendation.

In a further implementation form of the first, second, and third aspects, the at least one natural language recommendation is played as audio by a speaker of the client terminal.

In a further implementation form of the first, second, and third aspects, the at least one natural language recommendation is presented as text.

In a further implementation form of the first, second, and third aspects, the text is transmitted to the display of the client terminal using a member selected from the group consisting of: an email, a short message service (SMS), and a push message.

In a further implementation form of the first, second, and third aspects, the analysis of the predicted performance outcome is performed by computing the probability, for each possible cluster of target users complying with one respective additional target entity feature of a plurality of target entity features including arbitrary target entity features, performing the action associated with each respective content variation of the plurality of content variations.

In a further implementation form of the first, second, and third aspects, the following relationship is used to compute the probability of the action performed for each possible cluster of target users complying with the one respective additional target entity feature:

$$CTR(UI, UP) \sim Beta(1+actions(UI, UP), 1+(imps(UI, UP)-actions(UI, UP))$$

wherein:

CTR denotes the probability of the action of the content variation being performed, UI denotes the respective content variation, UP denotes the respective one additional target entity feature, Beta denotes a beta distribution function, Actions denotes the number of actions of the content variation performed, and Imps denotes the number of times the certain content variation is assigned.

In a further implementation form of the first, second, and third aspects, the analysis further comprises identifying, according to a requirement defining the highest computed probability, the one respective additional target entity feature defining the at least one other cluster of target entities to assign to the certain content variation.

In a further implementation form of the first, second, and third aspects, the method further comprises and/or the system further includes code for and/or the computer program product includes additional instructions for receiving, via the network, a selection of a certain sequential adjustment from the at least one sequential adjustment, iterating the acts of the method by: designating, according to the selection, each of the plurality of content variations to respective cluster of target entities that are compliant with the target entity features defined by the selected sequential adjustment and according to the at least one alternative decision rule, calculating at least one sub-sequential adjustment of the selected sequential adjustment, wherein the sub-sequential adjustment is based on at least one additional target entity feature, and wherein each sub-sequential adjustment is computed according to an analysis of the predicted performance outcome calculated based on assigning at least one of the plurality of content variations to respective target entities according to the selected sequential adjustment, and wherein each sub-sequential adjustment includes at least one alternative decision rule designating at least one content variation to a respective cluster of target entities that are compliant with at least one additional entity feature, and presenting, within a UI of the client terminal, the at least one sub-sequential adjustment, wherein the presented at least one sub-sequential adjustment includes the at least one additional target entity feature with which the cluster of target entities defined by the at least one sub-sequential adjustment is compliant, and at least one alternative decision rule including at least one content variation designated to respective clusters of target entities.

In a further implementation form of the first, second, and third aspects, the iteration is performed in response to a single click by the user of the client terminal.

In a further implementation form of the first, second, and third aspects, the plurality of content variations include variations of user interfaces of a web site and at least one associated desired action for performance by a user on a respective variation of the user interface of the web site.

In a further implementation form of the first, second, and third aspects, the plurality of content variations are selected from the group consisting of: medical treatments for a patient, items for sale on an e-commerce site, product placement arrangements in a physical retail store, items to present to physical retail store club members, items to present to e-commerce club members, items to present in a marketing campaign held using email or physical mail, items with a deep discount to new customers, an amount of the deep discount, travel destinations, visit itinerary, students for placement in two or more schools.

In a further implementation form of the first, second, and third aspects, the designation of each of the plurality of content variation to the respective cluster of target entities is performed according to a pre-set probability distribution.

In a further implementation form of the first, second, and third aspects, the method further comprises and/or the system further includes code for and/or the computer program product includes additional instructions for computing for each of the at least one sequential adjustments, an associated quality assessment score, wherein the quality assessment score provides a basis of comparison between sequential adjustments of different levels.

In a further implementation form of the first, second, and third aspects, wherein the quality assessment score is computed by performing: computing at least one of: an uplift value, and a probability of positive uplift, for each of the at least one sequential adjustment, wherein the at least one of uplift value and probability of positive uplift are computed based on the probability of the respective target entities of the at least one sequential adjustment performing the action associated with the content variation of the at least one sequential adjustment relative to a certain target entity of the respective cluster of target entities defined by the at least one alternative decision rule performing the action associated with the content variation of the at least one alternative decision rule, and further comprising presenting within the UI of the client terminal, the computed at least one of: uplift value, and probability of positive uplift, associated with the at least one sequential adjustment.

In a further implementation form of the first, second, and third aspects, the uplift value is computed according to the following relationships:

$$Uplift=100 \times (-1+/KPI(Qv, Qp)),$$

$$Action=f-KPI(Qv,Qp),$$

$$f=P(Sp) \times KPI(Sv,Sp)+P(cSp) \times KPI(Svr,cSp),$$

wherein:

Uplift denotes the uplift of the respective sequential adjustment,

Action denotes the KPI gain from the target entity of the respective cluster of target entities complying with the at least one target entity feature performing the action associated with the designated content variation, f denotes the probability of the action of the content variation being performed by an arbitrary target entity on an arbitrary content variations, Qv denotes the plurality of content variations, Qp denotes the set of possible target entity features of the target entities, Sv denotes the subset of Qv that is assigned to target entities complying with at least one target entity feature, Svr denotes the subset of Qv that is assigned to target entities that do not comply with the at least one target entity feature, Sp denotes the subset of Qp, of the target entities assigned to Sv, c denotes the complement of, KPI denotes the rate of performing the actions per target entity accessing the content variation of the designated content variation, and P denotes the proportion in the population of target entities.

In a further implementation form of the first, second, and third aspects, the method further comprises and/or the system further includes code for and/or the computer program product includes additional instructions for ranking the at least one sequential adjustment according to the quality assessment score computed for each sequential adjustment, selecting the highest ranked subset of ranked sequential adjustments according to a requirement, and presenting within the UI of the client terminal, the highest ranked subset of ranked sequential adjustments.

In a further implementation form of the first, second, and third aspects, each target entity feature of the at least one target entity feature is defined as a categorical variable.

In a further implementation form of the first, second, and third aspects, the at least one target entity features are selected from the group consisting of: gender, age, geographic location, demographic parameter, historical purchasing habits, type of device used to access the content, how content was reached.

In a further implementation form of the first, second, and third aspects, the plurality of content variations include a control content variation and a variation content variation evaluated as an A/B trial.

In a further implementation form of the first, second, and third aspects, the computing the at least one sequential adjustment is performed when a sufficient number of content variations are assigned such that the analysis of the at least one performance outcome provides a statistical significance of the at least one sequential adjustment according to a requirement.

In a further implementation form of the first, second, and third aspects, the analysis of the predicted performance outcome is performed using a set of values denoting, for each content variation, the total number of target entities having a certain combination of target entity features accessing the respective content variation and the total number of actions performed.

In a further implementation form of the first, second, and third aspects, content variations of the plurality of content variations differ from each other in at least one member selected from the group consisting of: an image, location of the image, text, location of the text, color, sound, available help, and layout.

In a further implementation form of the first, second, and third aspects, an action associated with each of the plurality of content variations is selected from the group consisting of: clicking a link, clicking an image, clicking an advertisement, filling out a form, making a call to a defined phone number, sending a message to a predefined network address, participating in a predefined chat, performing a medical treatment, and making a purchase.

In a further implementation form of the first, second, and third aspects, the plurality of content variations are hosted by a server in network communication with the computing device and the client terminal, wherein the target user uses another client terminal to access the assigned content variation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 is an example of an aggregation of real time performance data collected from a trial evaluating the two or more content variations, in accordance with some embodiments of the present invention;

DESCRIPTION OF SPECIFIC EMBODIMENTS OF THE INVENTION

Figure 1:
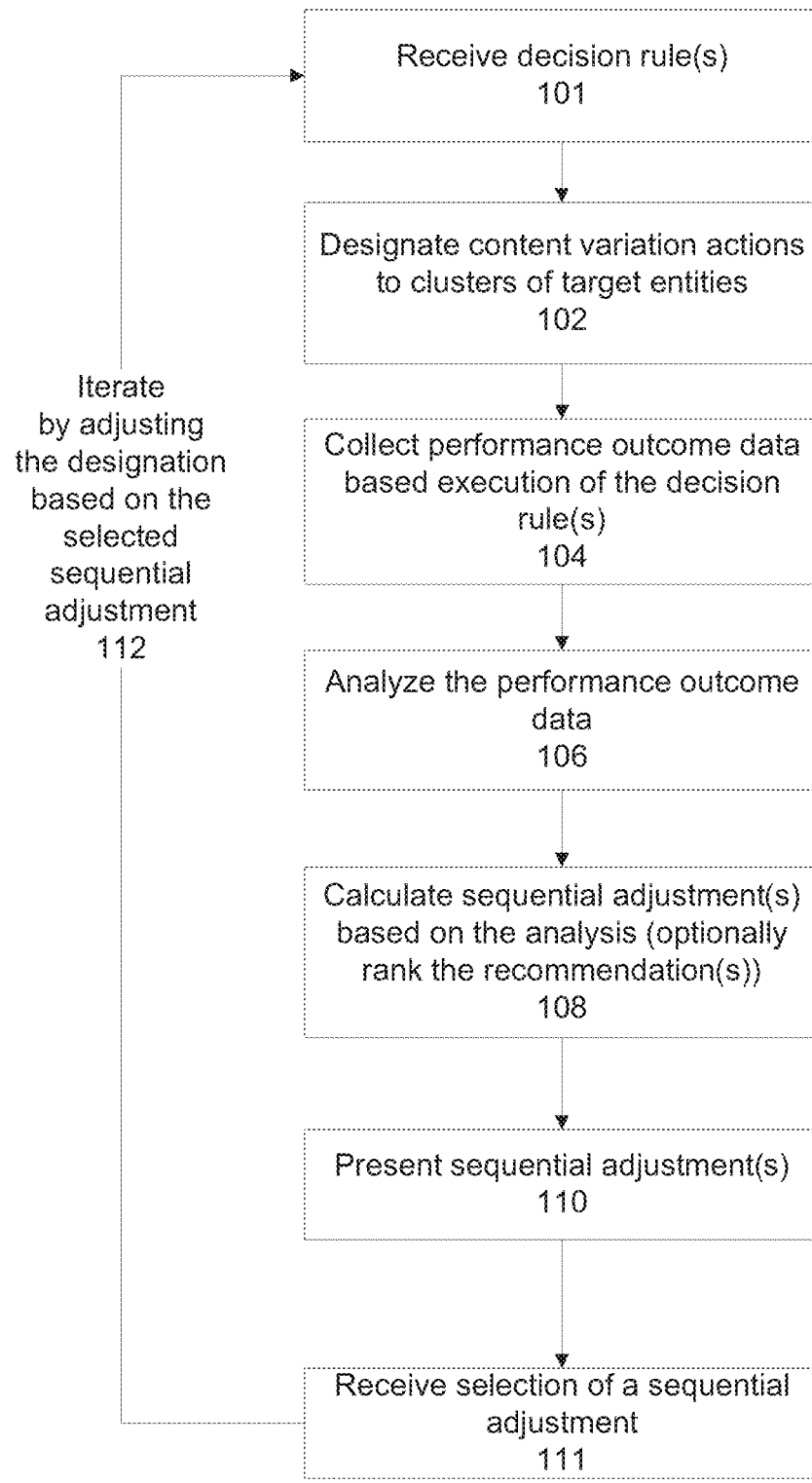
FIG. 1 is a flowchart of a method of a process that automatically calculates recommendation(s) for assigning one of two or more content variations to a cluster of target entities complying with feature(s), in accordance with some embodiments of the present invention.

The present invention, in some embodiments thereof, relates to systems and methods for distribution of content and, more specifically, but not exclusively, to systems and methods for recommending a cluster of target entities to assign to a certain content variation.

As used herein, the terms recommendations, sequential recommendations, and sequential adjustment may sometimes be interchanged. For example, a computed sequential recommendation may be implemented as the sequential adjustment. In another example, the computed sequential adjustments may be presented to a user as recommendations which may or may not be implemented or from which a selection for implementation is made, or the highest ranked sequential adjustment may be automatically selected and implemented as the selected sequential adjustment. One or more recommendations (i.e., sequential adjustments) may be presented to the user, from which a certain recommendation (i.e., sequential adjustment) is selected.

It is noted that the sequential adjustment(s) may be presented as recommendations to an administrative user (e.g., administrator, entity performing the evaluation of the content variations), which is not the target entity which is being provided the content variation and which is being monitored for performance of the associated action.

Sequential adjustment(s) may be implemented as a set-of-rules.

Sequential adjustments (also referred to herein as recommendations or sequential recommendations) define: (1) the target entity feature(s) for defining the cluster of target entities (i.e., the subset population), (2) content variation(s) designated for the cluster of target entities, and optionally (3) other content variation(s) for designation to entities not included in the cluster. The content variations of (2) and (3) are each associated with one or more actions for desired performance by the receiving target entity. For example, for the set of {A, B, C, D} content variations, each associated with a respective action defining the set of content variation s, and the target entity feature gender, the following sequential adjustments may be provided (e.g., presented on a display to the user): define the cluster as gender=female, and designate a content variation selected from the set of {A, B}, and for target entities excluded from the cluster (i.e., gender NOT=female) designate a content variation selected from the set {B, D}, which as a result will remove C completely. The action associated with each designated content variation may be, for example, clicking on a link, filling out a form, calling a telephone number, or initiating a defined chat session.

With respect to (2), the content variation(s) defined by each sequential adjustment may include a set of one or more content variations from which a single content variation is selected (e.g., randomly selected and/or selected according to a predefined distribution) for each target entity in the cluster (i.e., in the subset population). The content variation(s) are a sub-set selected from a set of possible content variations. With respect to (3), the other content variation(s) defined by the respective sequential adjustment may include another set of one or more content variations from which a single content variation is selected (e.g., randomly selected and/or selected according to a predefined distribution) for each target entity which is not included in the cluster. The another set of content variation(s) are another sub-set of the possible content variation(s). The another set of content variation(s) is provided to target entities which are not in the sub-population defined by the cluster. Each target entity not in the selected sub-population is provided with a single content variation and associated action(s) selected from the set of content variation(s), which are different from the content variations selected for the cluster.

The number of target entity features defining the cluster for receiving the content variation (s) of the respective sequential adjustment may be referred to herein as level. For example, Level 0 denotes selection of the entire population of target entities, since selection is based on zero entity features. Level 1 denotes selection based on a single entity feature, for example, gender=male. Level 2 denotes selection based on the Level 1 feature and one additional feature, for example, gender=male AND age>60.

Multiple sequential adjustments may be presented, for example, levels 0-2. The sequential adjustments may increase by one additional feature, or may jump by two or more features, for example, levels 1 and 3 may be presented without level 2. The selection of a certain sequential adjustment may trigger computation of one or more additional sequential sub-adjustments, which may include additional features. For example, selection of a level 1 sequential adjustment may trigger generation of level 2 and level 3 sequential sub-adjustments.

The systems, methods, and/or code instructions described herein provide a mechanism for comparison of different sequential adjustments having different levels, or in other words, which content variation(s) to designate to which target entities having target entity features in order to obtain the best performance results in terms of the target entity performing the action on the content variation.

As used herein, the phrase content variation refers to content variations that are each associated with one or more actions, which are provided to the visitor. Exemplary content variations include, for example, possible articles to display to a user (e.g., user entering a store, user accessing an online web site), and possible medical treatments for a health condition. The action of the content variation may refer to the designed behavioral outcome performed by the user presented with the content variation. For example the user clicking (on a link of the article) or buying (the article), or the user performing the medical treatment.

For example, the action refers to the user clicking on the link of the article when the content variation is presented, or the user performing the medical treatment. One or more actions may be selected for each content variation, for example, for a web site, a click by a user on a link and/or the user filling out a form for more information may be defined as actions. The recommendation may be to provide a certain content variation, for which it is expected that users are more likely to perform the action associated with the certain content variation.

As used herein, the term performance outcome, may sometimes be interchanged with the term measurable outcome, is measured when the user actually performs the action associated with the content variation when the content variation is provided. Exemplary performance outcomes include: key performance indicators (KPI), conversion rate, purchase rate, and click rate.

As used herein, the term target entity feature(s) refers to the features (optionally categorical features) for defining the selected sub-population (e.g., cluster) from the entire population. Exemplary target entity features include: gender, age group, and geographical location.

An aspect of some embodiments of the present invention relates to systems and/or methods (e.g., code instructions stored in a data storage device executed by one or more processors) that automatically calculate one or more recommendations (optionally at different levels) for assigning a certain content variation (optionally for a set of content variations) to a cluster of target entities complying with a certain feature(s), based on an analysis of performance outcome data collected during assignment of designated content variations and associated actions to a cluster of target entities which may comply with a common feature which is different than and/or in addition to the certain feature of the recommendation. The recommendation may include assigning the other content variation(s) (i.e., not the certain content variation) to other target entities associated with other feature(s) (i.e. not complying with the certain feature(s)).

Multiple sequential recommendations are computed. Each sequential recommendation includes a set of a sequentially increasing number of target entity features (i.e. levels) that may include all target entity features of the previous recommendation in the sequence, and one or more additional target entity feature (not included in the previous recommendations in the sequence). It is noted that levels may be skipped.

Optionally, the sequential recommendations are computed based on data collected from a baseline designation that defines assignment of target entities complying with a defined set of target entity features to content variations. Alternatively or additionally, the sequential recommendations are computed based on an iteration in which a first sequential recommendation is selected and implemented. The next sequential recommendation is computed based on data collected from the implemented first sequential recommendation.

The assignment of the content variations may be based on a baseline set of decision rules (also referred to herein as a Level 0 recommendation) in which the assignment is performed according to a random distribution that assigns one content variation from two or more content variations (e.g., a control content and one or more variations of the control content) to a target entity, independently of the features of the target entity, i.e., based on zero target features (e.g., 30% of target entities assigned to variation A and 70% to variation B). Alternatively or additionally, the assignment is based on a set of decision rules (e.g., received from a user using an interface) which define one or more common features of the target entity (e.g., 40% of male target entities to variation A, and 60% of female target entities to variation B).

The content variations are designed as an attempt to increase the probability of an action performed by the target entity accessing one content variation relative to the target entity accessing another content variation (e.g., the currently implemented content variation, a standard content variation, a default content variation).

The recommendation is presented within a user interface (UI), and includes the additional feature(s) (i.e., other than the common feature) of the target entity that is computed as being most likely to perform the action when the recommended content variation is presented, relative to a target entity having arbitrary feature(s) (and/or having the common feature) performing the action on the control content variation, for example, resulting in an increase in the performance outcome (e.g., uplift measure). The additional feature of the cluster of target entities identified by the recommendation is different that and/or in addition to the common features used to originally assign the cluster of target entities to the content variations (when such common features are used, as optionally the assignment of target entities is originally performed randomly without consideration of the features). The additional feature(s) of the cluster of target entities used to assign the content variations increase the probability of the action being performed over the original assignment designation using the common feature or using the random distribution.

As used herein, the term quality assessment score refers to the ability to compare the generated recommendations to one another, even when recommendations are associated with different levels. For example, the increase in probability of the action being performed when the recommendation is implemented in comparison to a baseline of an original decision rule (that defines designation of content variations to clusters of target entities compliant with target entity feature(s)), a random distribution, and/or compared to the recommendation having one less target entity feature.

Each sequentially increasing recommendation (with sequentially increasing number of target entity features) is associated with a quality assessment score. The recommendations with the sequentially increasing number of target entity features may be evaluated relative to one another using the quality assessment score.

It is noted that as described herein, the recommendations with increasing number of target entity features may provide unexpected results, for example, one recommendation may define assigning Variation A to target entities compliant with the target entity features female gender and United States as the geographical location, providing a quality assessment score of 24% (e.g., uplift), and the second recommendation in the sequence may define assigning Variation B to target entities compliant with the target entity features female gender, United States as the geographical location, and the additional feature Mobile device as the accessing client terminal, providing a quality assessment score of 18% (e.g., uplift).

The analysis is performed by computing the probability, for each possible cluster of target entities complying with a different additional feature (i.e., excluding the features defining the assignment of the content variation) and having arbitrary other additional features, performing the action associated with each content variation. The highest probabilities associated with a respective feature defining the cluster of target entities and the associated content variation are identified and used to generate each recommendation in the sequence. The analysis may be performed iteratively, using the existing data and/or using new data collected during implementation of one of the recommendations, to generate the next sequential recommendation of additional clusters of target entities complying with another different feature to assign to a content variation. The analysis of the next sequential recommendation is performed by computing the probability of target entities complying with another different feature performing the action.

Optionally, the recommendation is computed for a trial evaluating the content variations. The details of the trial may be defined using the UI. The UI may be hosted by a server in communication with multiple client terminals over a network (e.g., the internet). The server may execute the trial by assigning the content variation to the client terminal accessing a web server hosting the content. The server may collect the real time performance data of the trial, including the feature of the target entity using the client terminal, and whether the target entity performed the action associated with the assigned content variation. The server analyses the collected real time data to generate the recommendation(s), which are presented within the UI.

The recommendation(s) are optionally natural language recommendations presented using commonly understood everyday language, in a defined language, for example, English, French, German, Chinese, Japanese, Braille, and Sign language. The natural language recommendations may be presented using grammatically correct structured sentences, and using words commonly defined and found in a dictionary.

The natural language recommendation may be presented as text, raised dots on a surface (i.e., Braille), a graphic of a hand performing Sign Language, and/or as audio (e.g., a voice reading the text). The recommendation may be provided, for example, as an email, a short message service (SMS), a push message, and an audio call.

One of the recommendations may be selected using a single click. The selected recommendation may be automatically implemented by the server. The implemented recommendation may serve as a next sequential trial of the current trial, to evaluate the next sequential recommendation. In such a case, the trial is adjusted by defining the assignment of the content variations according to the target entity feature(s) defined by the selected recommendation. Real time performance data is collected for the next sequential trial, and analyzed to create a next sequential recommendation. The next sequential recommendation may further improve the probability of the target entity performing the defined action.

The process of adjusting the assignment of the content variations based on the selected recommendation may be iterated multiple times, with each iteration adding another feature used as a basis for assignment of the content variation. The additional features may further increase the probability of the target entity performing the action using the defined content variation.

Exemplary contents variations for which recommendations are calculated (as described herein) include: user interfaces of a website, medical treatments to apply to a patient, a trial of which item to present on e-commerce sites, a trial of product placement arrangements in a physical retail store, a trial of which items to present to physical retail and/or e-commerce club members, a trial of which item (or an array of items) to present in a marketing campaign held using email and/or physical mail, and a trial of which products and how much of a deep discount (i.e., where the business does not make money or loses money) to offer to recruit new customers, a trial of which travel destinations (or a visit itinerary) to provide to maximize sales and customer satisfaction according to a preference questionnaire filled out by the customers, and a trial of which students should be placed in which school according to a profile of the student. The target entity features that define which content variation action is assigned to which target entity are based on the target entity features of the respective target entity. For example, the medical treatments to apply to a patient may be assigned according to medical history characteristics of the patient, for example, blood test results. The entity features of the trial of which items to present at a physical retail store may be based on features of human purchasers purchasing items at the store.

The systems and/or methods (e.g., code instructions stored in a data storage device executed by one or more processors) described herein do not simply display information using a GUI. The systems and/or methods described herein are based on a specific, structured GUI paired with a prescribed functionality directly related to the GUI's structure that is addressed to and resolves a specifically identified problem.

The systems and/or methods (e.g., implemented as code instructions stored in a data storage device executed by processor(s) described herein present a technical solution to the technical problem of analyzing real time performance data collected for evaluating two or more content variations (e.g., variations of a user interface) to determine which content variation results in a higher probability of a target entity performing an action, where the target entity is defined according to one or more target entity features. The evaluation may be conducted in a network environment, in which target entities using client terminals access over a network a server hosting the content variations (e.g., a web site) being evaluated. The real timer performance data may include a large amount of data, which may be difficult and time consuming to analyze to discover relevant and/or statistically significant scenarios to implement when the number of combinations of values of features of the target entities is very larger.

Significant computational resources, storage resources, and/or time to analyze are required. The technical solution proposed herein automatically analyzes the data to select a small sequential set of recommendations (e.g., 1-5, or 2, or 3 or other numbers) which are presented within a UI optionally using natural language, which is easy to understand. For example, for N content variations (e.g., user interface variations), and K categorical features of target entities, where each i-th categorical feature includes $V\_i$ different possible values, the number of possible content variations to provide to all target entities is denoted as $2^N$. The number of possible feature combinations based on target entity feature vectors is denoted as $FV = V\_1 \times V\_2 \times \ldots \times V\_k$, where $2^{(FN)}$ ways to select which cluster of target entities to assign to a first content variation, and the rest of the target entities are assigned to a second content variation. Before removing redundant symmetries, there are $2^{(2N+V\_1 \times V\_2 \times \ldots \times V\_k)}$ possible feature combinations, which rapidly increases to a very large number, which make it difficult to identify the best combination(s) in a reasonable amount of time using reasonably available computational resources.

Taking advantage of symmetries may reduce the number by about 4, which still makes it difficult to identify the best feature combination(s) in a reasonable amount of time using reasonably available computational resources. The systems and/or methods described herein identify the best feature combination(s) within a reasonable amount of time using reasonably available computational resources by reducing the number of possible combinations to $FV \times N$, by considering the cases of assigning target entities having certain value(s) for features to a certain content variation. When the other target entities (having other value(s) of features) are assigned to another content variation, the number of possible combinations is still manageable, at $FV \times N \times N$.

The systems and/or methods (e.g., implemented as code instructions stored in a data storage device executed by one or more processors) described herein improve the performance of a server that performs the trial, analyzes the real time performance data, and/or generates the recommendations, by reducing the computational resources (e.g., processor utilization), storage device resources, and/or processing time for performing the trial, analyzing the real time performance data, and/or generating the recommendations. The improvement may be, for example, relative to brute force methods that analyze all (or a large number of) possible combination.

The systems and/or methods (e.g., implemented as code instructions stored in a data storage device executed by one or more processors) described herein improve the performance of a screen of the client terminal of a user conducting the trial, by reducing the requirements for presenting the generated recommendations. The recommendations, optionally natural language recommendations, may be presented as text, which may be displayed compactly on small screens (e.g., smartphone, watch computer, glasses computer), and/or using a small surface on a display presenting other data (e.g., within a small window, as a message presented on the border of the display). In fact, the recommendations may be presented without a screen at all, for example, using audio, which may be played back as a phone call to a phone, or using a microphone of a computer.

Moreover, the recommendations improve the ability of disabled users to use the client terminal, by presenting the recommendations to blind users (e.g., using Braille) and/or to deaf users (e.g., using Sign Language presented on the screen). The top recommendations (e.g., top 3-5) may be selected and presented, which may appear simultaneously on the display using the available space of the display within the GUI, rather than, for example, presenting a large number of recommendations and/or a large dataset which may require the user to shift between multiple screens in order to view the presented data.

The systems and/or methods (e.g., implemented as code instructions stored in a data storage device executed by one or more processors) described herein tie mathematical operations (e.g., computing the estimated uplift resulting for each recommendation, and/or selecting the recommendation(s)) to the ability of processor(s) to execute code instructions. The systems and/or methods (e.g., implemented as code instructions stored in a data storage device executed by one or more processors) described herein are tied to physical real-life components, including client terminals, server(s), and network equipment.

The systems and/or methods (e.g., implemented as code instructions stored in a data storage device executed by one or more processors) described herein generate new data in the form of sequential recommendations that define which variation(s) of the content to assign to which cluster of target entities according to common feature(s), and which other variation(s) of the content to assign to other target entities having other features.

The systems and/or methods (e.g., implemented as code instructions stored in a data storage device executed by one or more processors) described herein provide a unique, particular, and advanced technique of creating recommendations for a trial of two or more content variations each associated with an action.

Accordingly, the systems and/or methods (e.g., implemented as code instructions stored in a data storage device executed by one or more processors) described herein are necessarily rooted in networking and/or computer technology to overcome an actual technical (optionally network centric) problem arising in the technical field of distributing content variations (e.g., variation of a user interface) to increase the probability of a target entity performing an action.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein the term target entities may mean target users, target client devices, target application code, and/or other entities that perform the action associated with the designated content variation. The entity features are based on the target entity. For example, the entity features for target users may include demographic characteristics. The entity features for target client devices may include the type of device (e.g., Mobile device or desktop computer). The entity features for target application code may include the type of application code, for example, a web browser, the version of the application, and an application installed on a smartphone.

Figure 2:
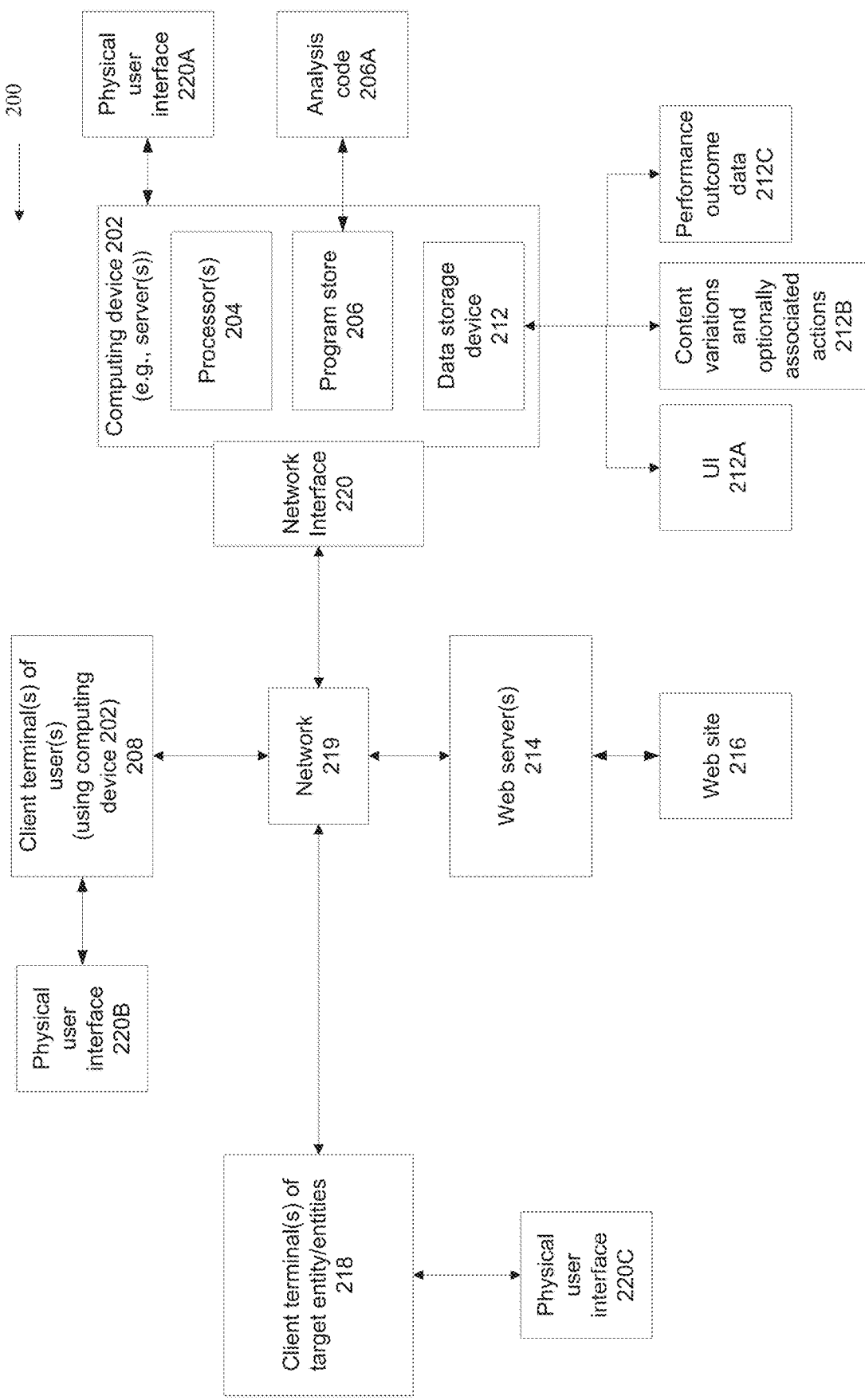
FIG. 2 is a block diagram of components of a system that includes a computing device that automatically generates and presents the recommendation(s) on a display using a UI (and/or plays audio using a microphone), in accordance with some embodiments of the present invention.

Reference is now made to FIG. 1, which is a flowchart of a method of a process that automatically calculates a sequence of recommendations for assigning one of two or more content variations to a respective cluster of target entities complying with an increasing number of feature(s), in accordance with some embodiments of the present invention. The recommendation(s) are based on the probability (e.g., highest probability of the possible recommendations) of a target entity of a cluster of target entities complying with one or more features performing an action associated with a certain content variation, optionally relative to another target entity having arbitrary feature values performing the action associated with control content variation. Reference is also made to FIG. 2, which is a block diagram of components of a system 200 that includes a computing device (e.g., server) 202 that automatically computes and presents the sequential recommendation(s) using a UI (and/or using audio), in accordance with some embodiments of the present invention.

It is noted that the content variations being evaluated (e.g., in a trial) may be associated with, for example, content of a website, content of an application installed on a Smartphone, content of an application installed on a kiosk (which may be in network communication with a server), and content of an application installed on a mobile device and/or a stationary device designed for a certain use, which may be in network communication with a server (e.g., patient monitoring device, smart house control device, automobile control interface). Alternatively, as described herein, the content variation may be indicative of, for example, a medical treatment for a patient, a school for a student, an arrangement of retail items within a physical store, and products and/or services being sold on an e-commerce site.

System 200 may implement the acts of the method described with reference to FIG. 1, optionally by processor(s) 204 of computing device 202 executing code instructions (e.g., analysis code 206A) stored in a program store 206 (i.e., a storage device).

Computing device 202 may be implemented as, for example, a client terminal, a server, a kiosk, a web server, a computing cloud, a mobile device, a desktop computer, a thin client, a Smartphone, a Tablet computer, a laptop computer, a wearable computer, glasses computer, and a watch computer.

Computing device 202 may include locally stored software that performs one or more of the acts described with reference to FIG. 1 (e.g., analysis code 206A), and/or may act as one or more servers (e.g., network server, web server, a computing cloud) that provides services (e.g., one or more of the acts described with reference to FIG. 1) to one or more client terminals 208 of users performing trials and viewing the computed human language recommendations.

Different architectures may be implemented based on system 200, and/or for execution of the acts described with reference to the method of FIG. 1. In an exemplary implementation, computing device 202 is a server, optionally a web server. The server may provide software as a service (SAAS) to one or more client terminals 208 over a network 210. The server may provide a remote access session to client terminals 208, for example, using a web browser to access UI code 212A hosted by the server implementation of computing device 202. The server may provide an application, code instructions, and/or a software interface, for local download to client terminals 208.

In another exemplary implementation, computing device 202 may communicate with another server 214, optionally a web server hosting a web site 216 for which the trial is being conducted, to evaluate two or more variations of content (e.g., user interfaces) for presentation to client terminals of target entities 218 (e.g., accessing web site 216). Computing device 202 may provide an application and/or code instructions for download and installation on web server 214. The application and/or code instructions may perform the selection of the content variation for presentation to client terminals 218 (e.g., visiting web site 216), and/or may collect features of the target entities using client terminals 218. Alternatively, the selection of the content variation and/or collected features may be controlled on web server 214 by computing device 204.

For example, client terminals 218 accessing the URL of web site 216 may be automatically directed to a mirror web site stored by computing device 202. In another example, the selection of the variation of the content may be performed by computing device 202 and transmitted for implementation by web server 214 using an interface, for example, an application programming interface (API), a software development kit (SDK), a remote function call, and/or using other implementations.

The feature(s) of the target entities and/or data indicative of whether the action is performed may be locally collected by web server 214 and transmitted to computing device 202, for example, using the interface (e.g., API, SDK, other implementations). Alternatively, computing device 202 acts as web server 214, by locally hosting web site 216, and locally performing the functions of assignment of the content variation, and collection of the features and whether the target entity performed the action associated with the assigned content variation.

In yet another exemplary implementation, computing device 202 may be a standalone device executing local and/or remotely installed code. For example, computing device 202 may be implemented as a kiosk with a display presenting the assigned variation of the content and collecting the features of the target entities, and whether the action is performed.

Processor(s) 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 204 may include one or more processors (homogenous or heterogeneous), which may be arranged for parallel processing, as clusters and/or as one or more multi core processing units.

Program store 206 stores code instructions implementable by processor(s) 204, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Program store 206 may store analysis code instructions 206A that when executed by processor(s) 204, implement one or more acts of the method described with reference to FIG. 1.

Computing device 202 may include a data storage device 212 for storing data. Data storage device 212 may be implemented as, for example, a memory, a local hard-drive, a removable storage unit, an optical disk, a storage device, and/or as a remote server and/or computing cloud (e.g., accessed using a network connection). It is noted that code instructions executable by processor(s) 204 may be stored in data storage device 212, for example, with executing portions loaded into program store 206 for execution by processor(s) 204. Data storage device 212 may include one or more data repositories, for example, code instructions, database entries, records, and/or other data described herein.

For example, data storage device 212 may store UI 212A used by client terminal(s) of user(s) 208 to define the content variation assignments (e.g., the trial) and/or view the recommendations (as described herein), variations of the content 212B (which are optionally stored in associated with one or more desired action for performance by the target entity) for presentation to client terminal(s) of target entities (s) 218, and/or the collected real time performance data 212C. Real time performance data 212C may include the features of the target entities, the assigned content variation, and whether the target entity performed the action associated with the assigned content variation.

Computing device 202 may include a network interface 220 for connecting to network 210. Network interface 220 may be implemented as, for example, one or more of, a network interface card, a wireless interface to connect to a wireless network, a physical interface for connecting to a cable for network connectivity, a virtual interface implemented in software, network communication software providing higher layers of network connectivity, and/or other implementations.

One or more of computing device 202, client terminal(s) of user(s) 208, and client terminal(s) of target entities(s) 218 include or are in communication with respective physical user interfaces 222A-C designed for a user to enter data (e.g., define the assignment of content variations, define the trial, select a recommendation for implementation) and/or view presented data (e.g., the recommendation(s)). Exemplary user interfaces 222A-C include, for example, one or more of, a touchscreen, a display, a keyboard, a mouse, a speaker, a microphone, a Braille pad, and voice activated software.

At 101, one or more decision rules are received. The decision rules denote an initial set of rules, before implementation of the selected sequential adjustment(s) (i.e., the recommendations). The decision rules define how the content variations are divided amongst the target entities, according to the target entity features. For example, the decision rules may define that males over 60 (i.e., target entity feature) are designated content variation A, and females under 40 are designated content variation B. The remaining target entities may be designated content variation C.

The decision rules may be manually defined by a user (e.g., an administrator), obtained from a storage device (e.g., stored in a database and/or in a file), and/or automatically computed. The decision rules may be received from a client terminal of the user accessing computing device 202, locally stored by computing device 202, and/or automatically computed by code executed by the processor(s) 204 of computing device. The decision rule may be a selection of a certain sequential adjustment during iteration of the acts described with reference to FIG. 1, as described with reference to act 112.

The decision rules (and/or other data described herein) may be received via an interface of computing device 202 and/or an interface of the client terminals of the target entities 218. The term interface or user interface (UI) used herein may include, for example, one or more of: a graphical user interface (GUI) presented on a screen, physical user interface (e.g., 220A, 220C), network interface 220, a software interface (e.g., virtual interface, application programming interface (API), software development kit (SDK) interface.

At 102, a designation of each content variation and an associated action may be received. The designation includes at least two variation (e.g., of content or other items being evaluated), each having an associated action. The designation may be implemented as a trial for evaluation of the two (or more) content variations according to whether the target entity performs the associated action. The designation may be entered by a user using physical user interface 220B of client terminal 208. The designation may be entered using a GUI presented on a display of client terminal 208, where the GUI includes a mechanism for the user to define the trial.

Each entity is designated a certain content variation from the set of possible content variations, according to the decision rule(s), according to whether the entity falls within the cluster or is excluded from the cluster. The certain content variation may be randomly drawn from the set of possible content variations according to a probability distribution, for example, a list of probabilities such as uniform distribution, and/or a split (e.g., 90%-10%) between the set of possible content variations which may be selected by the user.

It is noted that acts 101 and 102 may be executed as two independent acts, for example sequentially, and/or acts 101 and 102 may be executed simultaneously and/or in parallel as a single act.

The designation may be received as a set of decision rules that define designation of each of the content variations to a cluster of target entities that are compliant with a set of target entity features, as described with reference to act 101.

Each decision rule defines the selected population of target entities according to target entities features that are available at the moment of selecting the action associated with the content variation.

The decision rule defines the content variation(s) to assign to the target entities that comply with the set of target entity features (i.e., within the selected population). The decision rule defines (explicitly, or implicitly as a default selection) the content variation (s) to assign to the target entities that do not comply with the set of target entities features (i.e., out of the selected population).

Optionally, a set of decision rules is received. The set of decision rules is defined sequentially, with an increasing number of target entity features. Each member of the set of decision rules includes all of the target entity features of the previous decision rule in the sequence, and one additional target entity feature (not defined by decision rules with fewer number of target entity features).

The number of target entity features may be referred to herein as level. Level 0 denotes selection of the entire population of target entities, since selection is based on zero entity features. Level 1 denotes selection based on a single entity feature, for example, selection of males. Level 2 denotes selection based on the Level 1 feature and one additional feature, for example, selection of males from the United States.

The designation includes at least two content variations (e.g., user interfaces), which may be associated with, for example, an application, a physical object, and/or a website (e.g., website 216) hosted by a web server (e.g., web server 214) and/or hosted by another computing device and/or representing physical objects. One set of content is defined as the control content, which may represent the default and/or current content. One or more other content are defined as variations that are being evaluated in comparison to the control content. The content variations are similar to one another, optionally designed for similar use to achieve a similar goal, with slight differences between them.

The content variations may differ from each other, for example, in: an image, location of the image, text, location of the text, color, sound, available help, and layout. The remaining components of the content may remain static. For example, for a web page interface, the content variations may include different locations of an advertisement on the same web page.

The content variations may be stored in content variation repository 212B, which may be associated with data storage device 212 of computing device 202.

One of the content variation (i.e., the control content set one of the variation of the content) are assigned to a target entity (e.g., using client terminal 218) (e.g., to access website 216). The content variations are assigned to a cluster of target entities complying with at least one common feature, as described herein, for example, all target entities that are over the age of 60. Alternatively, the content variations are assigned to target entities independently of features of the target entities, optionally based on a predefined distribution, for example, a certain target entity is assigned content variation A with a probability of 30% and content variation B with a probability of 70%.

The designation of content variations to clusters of target entities that are compliant with the set of target entity features may be defined as a set of decision rules.

Optionally, the set of decision rules includes a sequence of designations, where content variations are designated to clusters of target entities that are compliant with an increasing number of target entity features, where each member of the sequence of designations includes the target entity features of the previous designation and one additional target entity feature not included in the previous designations.

An evaluation of whether the target entity performs the action(s) associated with the assigned content variation (e.g., at the assigned user interface of the website) is performed, as described below with reference to acts 104-106. The evaluation is performed to determine whether the variation content results in a relatively higher rate of target entities of the cluster of target entities complying with common feature(s) performing the associated action relative to performing the action associated with the control content. Exemplary defined actions include: clicking a link, clicking an image, clicking an advertisement, filling out a form, making a call to a defined phone number, sending a message to a predefined network address, participating in a predefined chat, performing a medical treatment, and making a purchase.

The assignment of content variations is performed for each target entity (e.g., each target entity accessing the web site associated with the user interface variations being evaluated). For example, a target entity accessing a news site (e.g., by entering the URL of the news site, or following a link to the news site) is randomly assigned to the control user interface of the news site, or to one of the variation user interfaces, or is assigned according to geographical location to a variation of the news site that includes content relevant to the geographical location (i.e., based on the common feature). The rate of performing the action is computed for the variation content and compared to the rate computed for the control content. When the rate is statistically significantly higher for the variation content compared to the control content, a conclusion may be made that selecting the variation content results in the higher rate.

Optionally, the trial is an A/B trial.

Optionally, two variations of content are evaluated, including a control content and a variation content. Alternatively more than two content variations may be evaluated, including a control content and two or more variation contents. It is noted that the control content may not necessarily be defined. The evaluation may be between two content variations without necessarily defining the control.

The assignment of the content variations (e.g., the trial) may be executed, for example, by computing device 202, which may host the web site, assign the variation content to the target entities, and collect the real time performance data.

The trial may be executed, for example, by computing device 202 interacting with web server 214 hosting web site 216, as described herein.

At 104, performance outcome data (e.g., real time performance outcome data) is collected for each target entity in association with each assignment of content variation. The data may be collected by computing device 202 and stored in performance outcome data repository 212C.

Exemplary performance outcome data collected for each assignment includes:

Additional features of the target entity. The additional features include features other than the common feature of the cluster of target entities assigned to the content variation. The additional features are analyzed as described herein to identify one or more of the additional features that when used to assign content variations increase the probability of the target entity performing the action.

The content variation assigned (e.g., randomly) to the target entity.

Whether the action associated with the assigned content variation is performed by the target entity.

Each feature may be defined as a categorical variable, which may take on one or more predefined values. Exemplary features include: gender (e.g. male, female), age (e.g., young, middle age, old), geographic location (e.g., country, state, city), demographic parameter (e.g. income), historical purchasing habits (e.g., total value of previous purchases made at the web site), type of device used to access the content variation (e.g., mobile device), how content variation was reached (e.g., link from search engine, manually entering the address of the content, link provided by another set of content).

The feature data may be collected, for example, by requiring the target entity to log-in to view the content variation by entering values for features (e.g., entering their age, gender, geographical location), by identifying the target entity and/or the client terminal of the target entity (e.g., by network address, by code installed on the client terminal of the target entity (e.g., cookie)), by accessing a remote database, and/or by querying the client terminal of the target entity.

Optionally, the data collected from multiple assignments is aggregated. The aggregation may be performed based on each combination of assigned content variation and feature. For each combination of assigned content variation and feature, the total number of target entities may be stored, and the total number of performed actions may be stored. For example, for a trial of two content variations (denoted as A and B), during which the collected features includes gender and age, the following combinations may be available: {A, male, young}, {B, male, young}, {A, female, young}, {B, female, young}, {A, male, old}, {B, male, old}, {A, female, old}, {B, female, old}.

For example, for the set of combinations discussed above, the following values of total number of target entities and performed actions may be stored: {A, male, young}={100, 10}, {B, male, young}={110, 5}, {A, female, young}={100, 15}, {B, female, young}={110, 20}, {A, male, old}={100, 8}, {B, male, old}={110, 11}, {A, female, old}={100, 12}, {B, female, old}={110, 7}.

Figure 3:
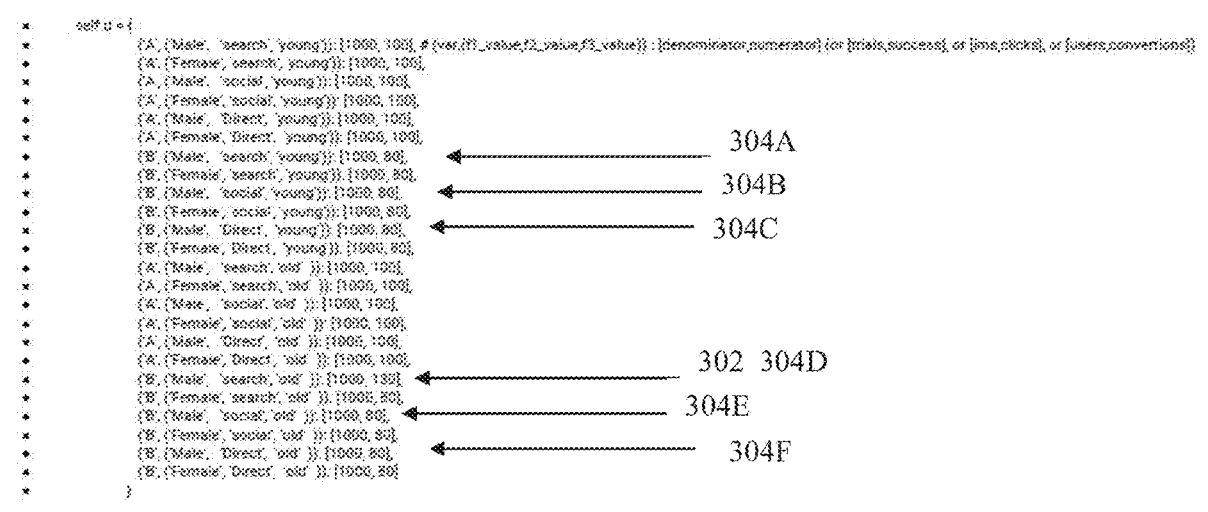

Reference is now made to FIG. 3, which depicts an example of an aggregation of data collected from a trial, in accordance with some embodiments of the present invention. Each line of the dataset defines a certain combination of the assigned content variation (A or B), and a certain combination of features (Male or Female; search, social, or direct; young and old, the number of times the content variation has been assigned), and the number of times that the action is performed.

Referring now back to FIG. 1, at 104, another example of the aggregation of data collected based on the assignments (e.g., from the trial) is depicted in the table below. The table summarizes the number of times each content variation is assigned (denoted as imps) and the number of times the action is performed (denoted as clicks), per feature (i.e., Female or Male).

| (imps; clicks) | Content Variation A | Content Variation B | Total |
|---|---|---|---|
| Female | (1000; 110) | (1000; 70) | (2000; 180) |
| Male | (1000; 80) | (1000; 100) | (1000; 180) |
| Total | (2000; 190) | (2000; 170) | |

Referring now back to FIG. 1, at 106, the performance outcome data is analyzed, optionally by analysis code 206A executed by processor(s) 204 of computing device 202.

The analysis may be performed by computing the probability of the action performed for each combination of content variation and one of the additional feature(s).

As discussed herein, computing the probability for one of the additional features, rather than for multiple combinations of features, improves computational performance.

Optionally, the analysis includes computing, for each one of the additional features, the uplift value (i.e., the difference between the rate of the actions (i.e., total number of actions divided by total number of assignments) performed for the variation content relative to the rate of the actions performed for the control content (i.e., benchmark). Alternatively or additionally, the analysis includes computing the probability of positive uplift for each one of the additional features relative to the control content (i.e., the benchmark). The rate computed for the control content used as the benchmark may be defined using the number of actions performed by all target entities (irrespective of their features) to the control content, or using the number of actions performed by the cluster of target entities complying with the common feature(s).

Optionally, the following relationship is used to compute the probability of the defined action performed, for every one of the additional features (with arbitrary values of the other features) and assigned content variation:

$$CTR(UI, UP) \sim Beta(1+actions(UI, UP), 1+(imps(UI, UP)-actions(UI, UP))$$

wherein:

CTR denotes the probability of the action of the content variation being performed, UI denotes the respective content variation, UP denotes the respective one additional target entity feature, Beta denotes a beta distribution function, Actions denotes the number of actions of the content variation performed, and Imps denotes the number of times the certain content variation of the content variation is assigned.

Reference is now made to 5, which is a dataflow diagram depicting additional details of an exemplary analysis of the performance outcome data, for example, as described with reference to block 106 of FIG. 1, in accordance with some embodiments of the present invention. To compute CTR(A) (denoted by call out number 502), which denotes the click through rate (CTR) for content variation A, CTR(A,male) (the CTR for target entities having the male feature for content variation A, denoted by call out number 504) and CTR(A,female) (the CTR for target entities having the female feature for content variation A, denoted by call out number 506) are computed according to the following relationships:

$$CTR(A,male) \sim Beta(1+clicks(male), 1+(imps(male)-clicks(male)),$$

$$CTR(A,female) \sim Beta(1+clicks(female), 1+(imps(female)-clicks(female)),$$

$$W(male)Beta(1+imps(male), 1+imps(female)),$$

$$W(female)=1-W(male),$$

$$CTR(A)=W(male) \times CTR(A,male)+W(female) \times CTR(A,female)$$

where:

Beta denotes a beta distribution function,

Clicks denotes the number of actions (i.e., clicks) performed, and

Imps denotes the number of times the certain content variation is assigned.

The computations may be vectors (e.g., each variable is implemented as a vector of the produced samples).

Moreover, in another example, CTR(B,male) may be computed as:

CTR(B,male)~Beta(1+clicks(B,male),1+(imps(B,male)-clicks(B,male)), where the values of clicks(B,male), imps (B,male), and clicks(B,male) are obtained by summing the relevant rows 304A-F of the aggregated dataset described with reference to FIG. 3.

Referring now back to block 106 of FIG. 1, alternatively or additionally, the following relationships are used to compute the uplift, using the benchmark of leaving the defined trial running:

$$Uplift=100 \times (-1+f/KPI(Qv, Qp)),$$

$$Action=f-KPI(Qv,Qp),$$

$$f=P(Sp) \times KPI(Sv,Sp)+P(cSp) \times KPI(Svr,cSp),$$

where:

Uplift denotes the uplift of the respective recommendation,

Action denotes the KPI gain from the target entity of the respective cluster of target entities complying with the at least one common target entity feature performing the action associated with the assigned content variation, f denotes the probability of the action of the content variation being performed by an arbitrary target entity on an arbitrary content variation, Qv denotes the plurality of content variations, Qp denotes the set of possible features of the target entities, Sv denotes the subset of Qv that is assigned to target entities complying with at least one common feature, Svr denotes the subset of Qv that is assigned to target entities that do not comply with the at least one common feature, Sp denotes the subset of Qp, of the target entities assigned to Sv, c denotes the complement of, KPI denotes the rate of performing the actions per target entity accessing the content variation, and P denotes the proportion in the population of target entities.

Figure 6A:
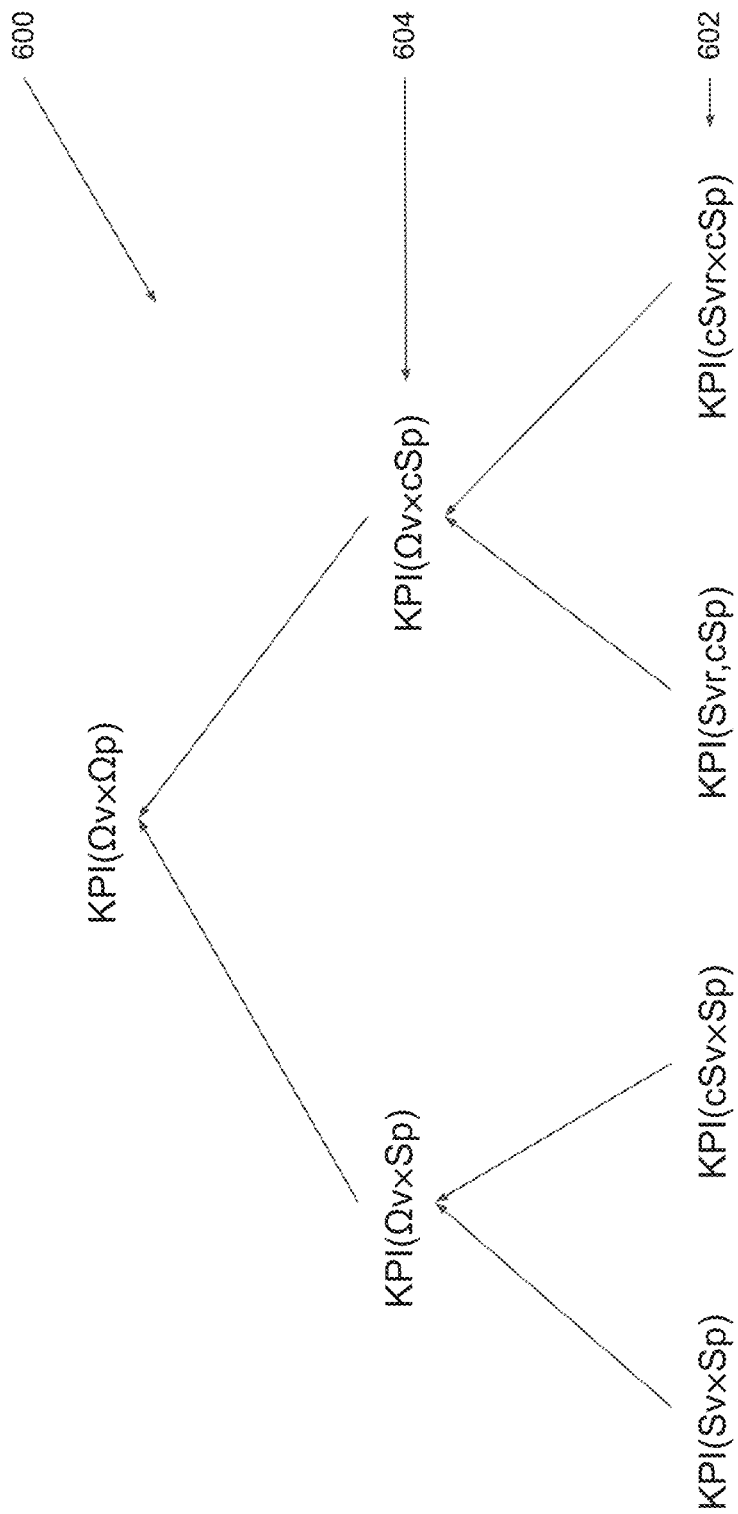
FIG. 6A is a dataflow diagram depicting an exemplary method for computing the uplift for a certain recommendation, in accordance with some embodiments of the present invention.
Figure 6B:
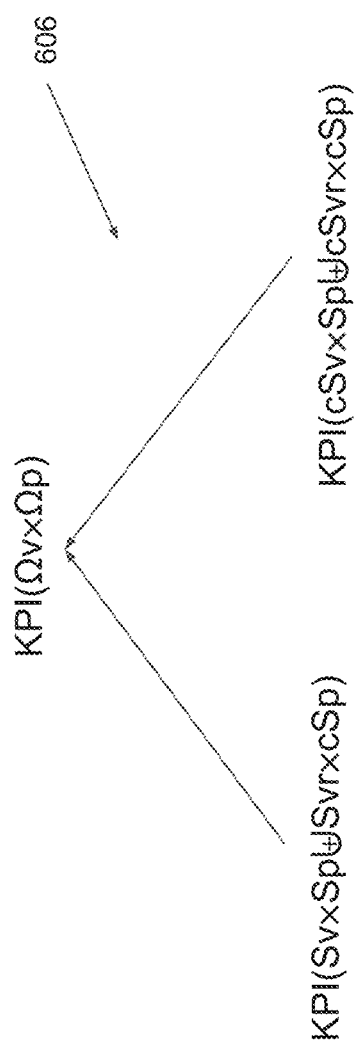
FIG. 6B is another dataflow diagram depicting another exemplary method for computing the uplift for a certain recommendation, in accordance with some embodiments of the present invention.

Reference is now made to FIGS. 6A-6B, which are dataflow diagrams depicting an exemplary method for computing the uplift for a certain recommendation, in accordance with some embodiments of the present invention. The dataflow diagram is organized as a tree 600, as shown in FIG. 6A. The values computed on the bottom row (e.g., leaves) 602 of tree 600 are independent random variables: KPI(Sv×Sp), KPI(cSv×Sp), KPI(Svr×cSp), and KPI(cSvr× cSp). Tree nodes (composed random variables) 604 receive the action sample (i.e., whether the action was performed by the target entity associated with the assigned content variation), and propagates the P to the children nodes: P is propagates to the left, and 1−P is propagated to the right, with the children propagating the P to their children as is. Tree 606 shown in FIG. 6B denotes a dataflow diagram of a more computationally efficient process of computing the uplift (relative to FIG. 6A), in accordance with some embodiments of the present invention.

Exemplary code instructions may be used to implement the method described with reference to tree 600 of FIG. 6A and/or tree 606 described with reference to FIG. 6B. For example, code instructions may implement tree 600 and/or 606 using special class definitions (e.g., vertexes). The vertexes may be implemented as leaves (e.g., independent bottom level random variables), and/or nodes (that include two or more vertexes as children). Each vertex may include a BinaryVariation and/or RevenueVariation instance as a member from which samples may be drawn. Each vertex may include a P vector initiated as np.ones(integration_sample_size), which is multiplied every time a parent propagates a P sample down to the vertex.

The implementation of the method (e.g., code instructions) described with reference to FIGS. 6A-6B may be based on the following assumptions: cells in the (Qv, Qp) space are independent, KPI do not change with time, the probability of receiving a specific feature vector is unknown but constant in time, and the distribution of visitor traffic between variations is unknown but constant in time. Alternatively or additionally, the analysis of the performance outcome data may be performed for a revenue based trial (e.g., revenue based A/B trial), which is a non-binary trial. The analysis may be based on the assumption that the majority of accesses of the assigned content set result in zero value (i.e., no action performed by the target entity, no purchase by the target entity). The analysis may be based on the relationship c~Bernoulli(p), where c denotes the number of times that the action is performed (e.g., making a purchase using the assigned user interface), and p denotes the probability of the target entity performing the action. Given the target entity performed the action, the revenue is obtained using an exponential distribution, denoted by the relationship r~Exp(θ), where θ denotes the expected value of the purchase by the target entity.

The value (denoted v) a target entity is expected to bring may be modeled using the relationship denoted as v=c×r. Alternatively or additionally, the analysis for the revenue trial may be performed based on the Bayesian viewpoint (e.g., for each set of content). The analysis using the Bayesian viewpoint may be performed by promoting the probability of performing the defined action (denoted as p) to random variable status, based on the relationship p~Beta (1+c, 1+(n−c). θ is promoted to random variable status, based on the relationship 1/θ~Gamma(k+c,Θ/(1+Θcs), where k and Θ are defined constants determined according to global statistics, s denotes the average revenue per target entity performing the defines action, and cs denotes the total revenue for the respective content set. Is it noted that the distribution is over a two dimensional space defined by (p, θ)

Referring now back to FIG. 1, at block 108, one or more recommendations, optionally the sequence of recommendations, are calculated according to the analysis of the performance outcome data. Each recommendation defines a recommended content variation (e.g., from the content variations evaluated by the trial) to assign to another cluster of target entities complying with one of the additional features collected during the assignment (i.e., a feature(s) other than the common features used to perform the assignment). The other content variation(s) is assigned to other target entities having other features. For example, the recommendation may include assigning the B content variation to another cluster of target entities having the features {female, young}. In the example, the feature female was used as the common feature to perform the assignment, and the feature young is the additional identified feature. The A content variation is assigned to the other target entities having other features.

One or more of the calculated recommendations may be selected for presentation to the user using the UI, based on one or more of the following: high expected uplift value, high probability of positive uplift, uplift has low variance, and/or uplift has high worst case.

Optionally, a set of recommendations (optionally the sequence of recommendations) is created based on the combinations of content variations and individual additional features. Each recommendation may be ranked according to the computed uplift value, and/or the computed probability of positive uplift, computed based on each one of the additional features. The highest ranked recommendation(s) may be selected according to a requirement, for example, select the top predefined number of recommendations (e.g., 3, 5, or other number), and/or select all recommendations that result in an uplift above a predefined percentage (e.g., 5%, 10%, 15%, or other values).

Optionally, the recommendation(s) are calculated when a sufficient number of content variation assignments are performed, such that the analysis of the performance outcome data provides a statistical significance of the recommendation(s) according to a requirement. For example, the recommendations are calculated when the statistical significance of the computed resulting uplift value and/or computed probability of positive uplift value is greater than a threshold, for example, $p<0.05$, or other values.

Optionally, one or more sequential recommendations are calculated for each recommendation according to the analysis of the performance outcome data. Each sequential recommendation defines a sequential recommended content variation from the other content variations to assign to a sequential recommended target entity cluster of the other target entity clusters based on another one of the additional features. For example, based on an example in which the recommendation includes assigning the B content variation to the cluster of target entities having the features {female, young} where female is the common feature and young is the additional feature, and assigning the A or C content variation to the other target entities having other features, the next sequential recommendation may include assigning the C content variation to another cluster of target entities having the features {female, old} where female is the common feature and old is another additional feature, and assigning target entities having the other features to the A content variation.

At 110, the recommendation(s), optionally natural language recommendation(s) is presented, by being presented within a UI (e.g., GUI) presented on a display of the client terminal, by being played on a speaker(s) of the client terminal, and/or by adapting a Braille pad. One or multiple sequential adjustments may be presented, from which the user selects one sequential adjustment for implementation.

The recommendation(s) may be presented as text, and/or presented as a graphic of a hand performing a Sign Language translation of the text. Alternatively, the recommendation(s) may be provided as audio, for example, a synthesized voice reading the text. The audio may be played, for example, as a phone call to a phone, provided as a sound file that may be played by the user, and/or as audio played using speakers of client terminal 208. Alternatively or additionally to presentation of the text within the UI, the text may be transmitted to the display of the client terminal (and/or another computing device used by the user) using, for example, an email, a short message service (SMS), and a push message that is presented on the display irrespective of other executing applications.

Optionally, the highest ranked set of recommendations are presented, for example, a predefined number of recommendations having the highest calculated uplift values and/or the highest probability of positive uplift, and/or the recommendations having calculated values above a predefined threshold and/or probability of positive uplift value above a predefined threshold.

The displayed recommendation includes one or more of the following:

Instructions to assign one (or more) of the content variations to a cluster of target entities complying with one additional feature (i.e., other than the common feature used to perform the initial assignment during the evaluation), and assign one (or more) of the other content variations to other target entities having other features.

The computed uplift value and/or computed probability of positive uplift, within the recommendation(s).

One or more sequential recommendations associated with the presented recommendation.

Optionally, one or more values representing percentile(s) of the distribution of the uplift of the recommendation relative to assigning the control content variation to all target entities is presented, for example, the $5^{th}$, $50^{th}$, and $95^{th}$ percentiles. The user may select the percentile to implement depending on desired aggressiveness level.

An example of the (natural language) recommendation includes: "send target users having the characteristics [(Male, search, old)] to the [B] content variation, and the rest send to the [A] content variation, to get an expected KPI (key performance indicator) gain of 0.0104 (uplift of 10%) compared to leaving the trial running, with probability of 87% for positive uplift. The [5.0, 50.0, 95.0] percentiles of expected KP gain are [0.0073 0.0104 0.0134]."

In another example, the following exemplary dataset computed based on the collected performance outcome data is used to create top 3 recommendations that are presented using text. The exemplary dataset may be implemented as (where the first field denotes the content variation, the second field denotes the additional feature, and the set of numbers in square brackets denote total number of assignments and total number of performed actions):

```
self.d = {
    ('Tax_free', ('IN_Kids_category_browsers',)): [105302,
        5593],
    ('Tax_free', ('OUT_OF_Kids_category_browsers',)):
        [342435-105302, 11044-5593],
    ('Tax_Def', ('IN_Kids_category_browsers',)): [35621,
        1691],
    ('Tax_Def', ('OUT_OF_Kids_category_browsers',)):
        [106153-35621, 3426-1691], }
```

The top 3 (natural language) recommendations created based on the exemplary dataset, presented using text, include:

Recommendation 1: send target users with the [('OUT_OF_Kids_category_browsers',)] characteristic to ['Tax_Def'] content variation, and the rest send to ['Tax_free'], to get expected KPI gain of 0.0013 (uplift of 4.03%) compared to leaving the trial running, with probability of 0.99985 for positive uplift. The [5.0, 50.0, 95.0] percentiles of KPI gain are [0.00070891 0.00130201 0.00190373].

Recommendation 2: send target users with the [('OUT_OF_Kids_category_browsers',)] characteristic to ['Tax_Def'] content variation, and the rest send to ['Tax-Def', 'Tax_free'], to get expected KPI gain of 0.0008565 (uplift of 2.65%) compared to leaving the trial running, with probability of 0.9934 for positive uplift. The [5.0, 50.0, 95.0] percentiles of KPI gain are [0.00028625 0.00085456 0.00143586].

Recommendation 3: send target users with the [('IN_Kids_category_browsers',)] characteristic to ['Tax_free'] content variation, and the rest send to ['Tax_Def', 'Tax-free'], to get expected KPI gain of 0.0004465 (uplift of 1.3840%) compared to leaving the trial running, with probability of 0.999 for positive uplift. The [5.0, 50.0, 95.0] percentiles of KPI gain are [0.00027301 0.00044681 0.00061893].

In yet another example, the aggregated dataset described with reference to FIG. 3 is used to compute one or more recommendations for presentation using the UI. Aggregated data combination 302 may be selected for the top (natural language) recommendation presented as: "send target users having the characteristics [(Male, search, old)] to [B] control variation, and the rest send to [A] control variation, to get expected KPI gain of 0.01040 (uplift of 11.28%) compared to leaving the trial running, with probability of 1.0 for positive uplift. The [5.0, 50.0, 95.0] percentiles of expected KPI gain are [0.00734593 0.01040465 0.0134715]."

Referring now back to FIG. 1, the UI may include options (e.g., by clicking on a link and/or selecting from a menu) to present additional data associated with the recommendation, for example, data on how and/or why the recommendation was selected. The additional data may be presented visually and/or numerically. For example the raw data used to compute the uplift and/or probability of positive uplift may be presented.

Figure 4A:
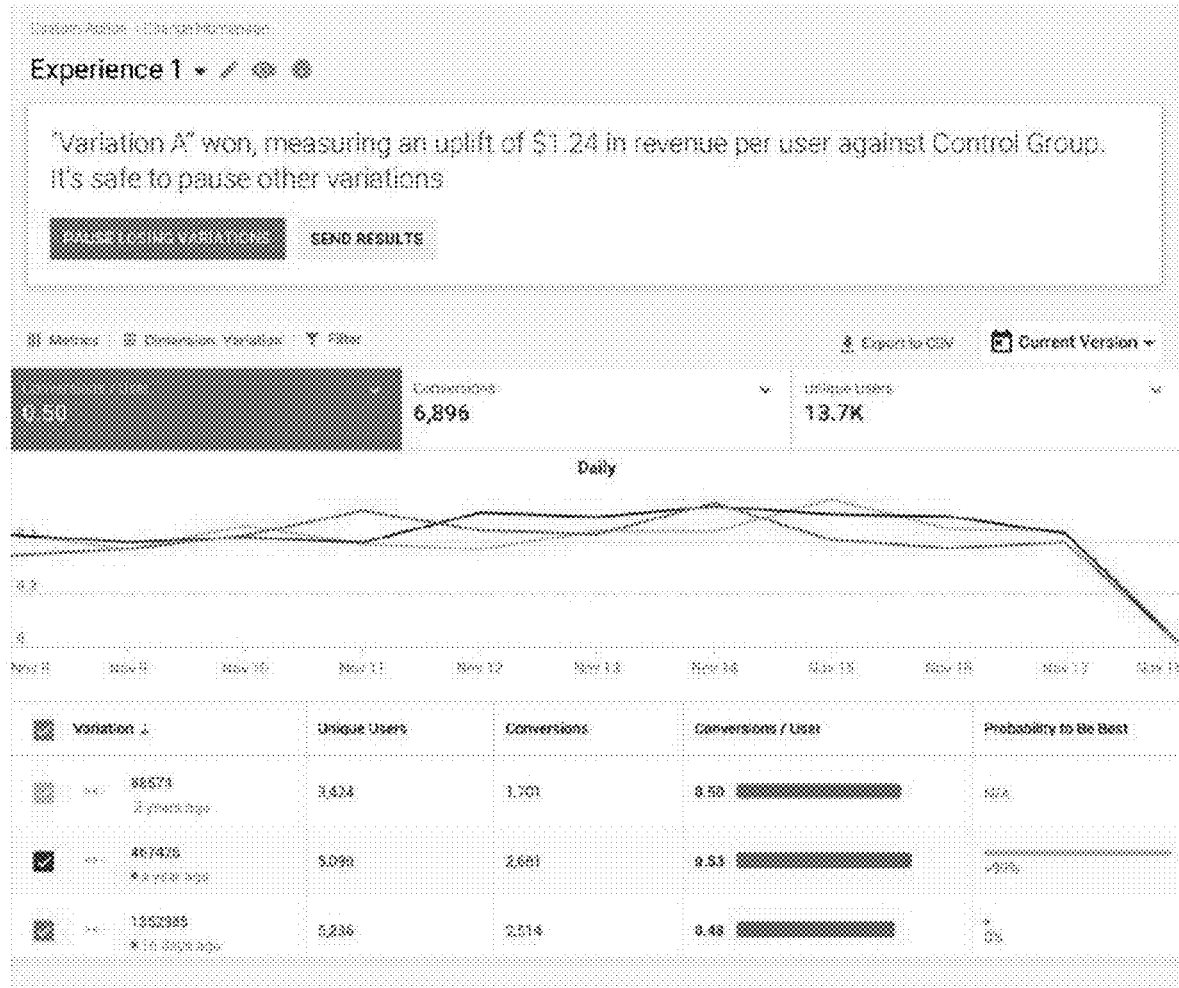
FIG. 4A is a schematic of an exemplary GUI displaying a computed uplift value in a standard A/B trial comparing a variation of a user interface with a control user interface.
Figure 4B:
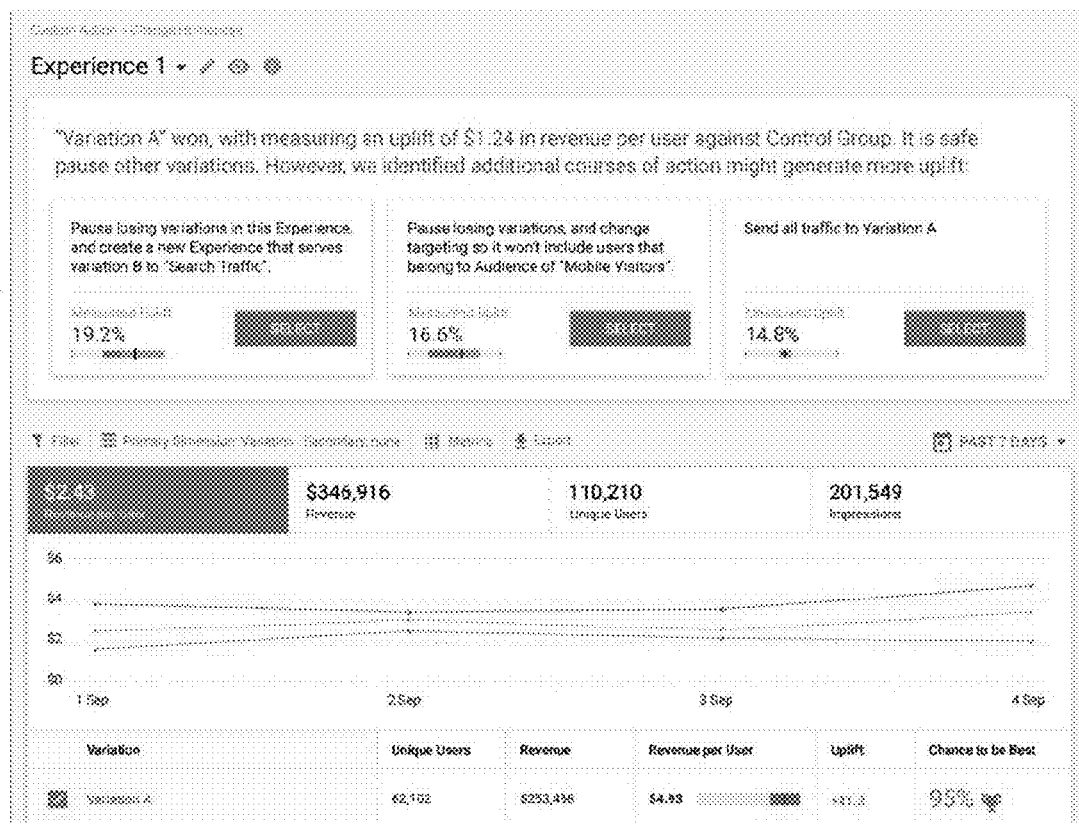
FIG. 4B is a schematic of an exemplary GUI displaying recommendations, in accordance with some embodiments of the present invention.
Figure 4C:
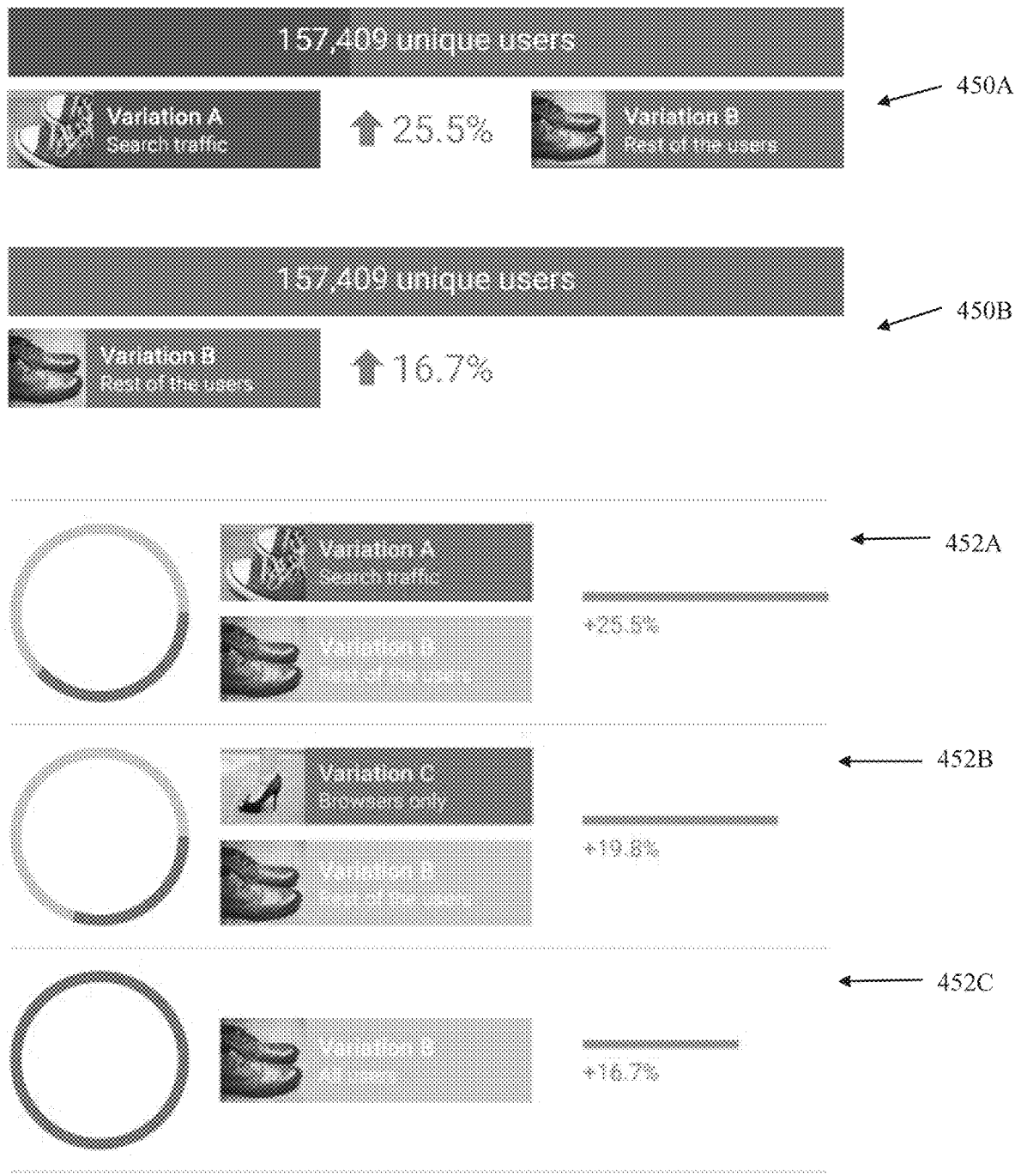
FIG. 4C is a schematic of another exemplary GUI displaying recommendations, in accordance with some embodiments of the present invention.
Figure 5:
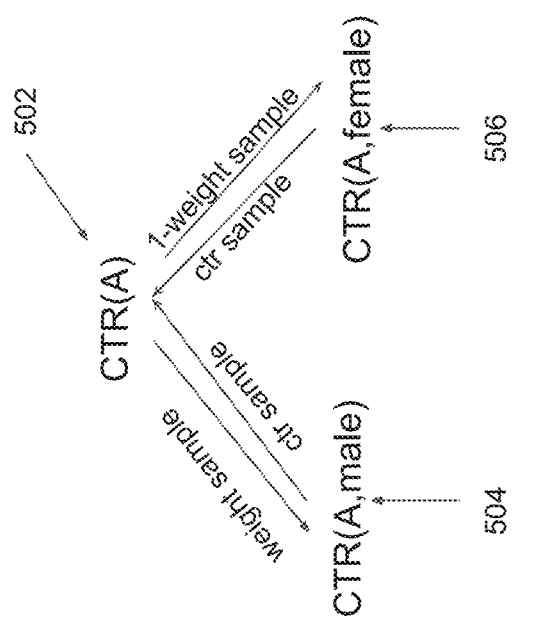
FIG. 5 is a dataflow diagram depicting additional details of an exemplary analysis of the real time performance data, in accordance with some embodiments of the present invention.

Reference is now made to FIGS. 4A-4C, which are schematics respectively depicting an exemplary GUI displaying results of a standard A/B trial, and an exemplary GUI displaying recommendations, in accordance with some embodiments of the present invention.

FIG. 4A depicts an exemplary GUI displaying a computed uplift value in a trial comparing a variation of a user interface with a control user interface. The uplift is computed for all visitors participating in the trial.

FIG. 4B depicts an exemplary GUI based on the same conducted trial as in FIG. 4A. The exemplary GUI displays 3 recommendations. The top 3 recommendations are presented, according to the highest measured uplift. It is noted that the measured uplift of the top 2 recommendations is higher than the measured uplift of the standard computed uplift as shown in FIG. 4A. The top recommendation is to send target entities having the feature search traffic to user interface variation B (it is noted that the recommendation is in contrast to the results of FIG. 4A, in which interface variation A is determined as having the best uplift value). The second recommendation is to exclude mobile visitors. The third recommendation is to assign user interface variation A to all visitors (similar to the results of FIG. 4A).

FIG. 4C depicts an exemplary GUI displaying a computed uplift value in a trial in which target entities are designated to one of three content variations (A, B, or C) according to compliance with the target entity feature of how the target entity arrived at the web page in which the trial is being conducted: based on a search (termed Search traffic), directly from a browser by entering the address of the web page (termed Browsers only), and other methods (termed All users). GUI 450A and 542B present a graphical recommendation that displays an estimated 25.5% uplift when entities compliant with the feature search traffic are assigned to Variation A, and the rest of the users are assigned to Variation B, which was computed using data collected from 157,409 users. GUI 450B and 452C present another graphical recommendation that displays an estimated 16.7% uplift when all users are directed to Variation B. GUI 452B presents another graphical recommendation that displays an estimated 19.8% uplift when entities compliant with the feature Browsers only are assigned to Variation C and the rest of the users are assigned to Variation B.

Referring now back to FIG. 1, optionally, at 111, a selection of one of the recommendations is received (e.g., from UI 212A), for example, by the user clicking one of the recommendations, or ticking a box next to one of the recommendations. The selection may be performed using a single click. A sequential recommendation may be received.

At 112, blocks 102-110 are iterated, using the selected recommendation. The execution of blocks 102-110 may create new sequential sub-recommendations based on the iteration, and/or confirm that the selected recommendation is the best recommendation.

It is noted that in each iteration, recommendations may be computed and presented from different levels, which may not necessarily be incremented by 1. Levels may be skipped. For example, in a first iteration, a recommendations of level 0 is executed (i.e., all target entities are provided the same content variation, or the provided content variation is randomly selected from a common set of content variations) and in a second iteration, another recommendation of level 2 is executed (e.g., male>40 receive content variation A and other entities receive content variation B).

Optionally, the selected recommendation is automatically implemented. The automatic implementation may be triggered in response to the single click selection. For example, code instructions may be automatically generated and installed on a website (and/or application) hosting the content set(s). The code instructions may obtain the visitor profile of the user, and assign the content sets according to the visitor profile.

Alternatively or additionally, the selected recommendation is automatically implemented as an adjustment to the assignment (e.g., adjustment to the trial). It is noted that the data collection is not necessarily reset, but additional data may be collected and analyzed in conjunction with the previously collected data. The assignment of the cluster of target entities to the content variations is adjusted according to the selected recommendation. The adjusted assignment is performed by assigning the cluster of target entities complying with the additional feature to the content variation, as defined by the selected recommendation. The adjustment may be performed in addition to, or in place of, the existing assignment instructions. Target entities having other features (i.e., not the common feature, and not the additional feature of the selected recommendation) are assigned one or more of the other content variations.

An example is now described to illustrate the method described with reference to FIG. 1, and/or using the system described with reference to FIG. 2.

User Bob sets-up a trial to evaluate which one of three side-bar promotions (A, B, C) provides the large purchases (denoted as conversion rate (CR)). The trial is targeted to the cluster of target entities having the feature "visitors that purchased more than $100 from the website in the past". Performance outcome data is collected from the executing trial, and analyzed. Two days later, Bob receives the following email: "Hey Bob, Did you know that in experience GridSideBar, sending target user from the audience "basketball-end-use" to variation C, and the rest to (A or B) will gain you an expected 30% uplift with probability of 80% for positive uplift? Regards". Bob logs into the computing device, goes to the experience report and drills down to the conditions recommendation screen, where he sees the top 5 recommended (nested) conditions. Bob identifies the top condition from his e-mail and deploys it with a single click.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant user interfaces will be developed and the scope of the term user interface is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method for dynamic generation of a graphical user interface (GUI) of a web page for increasing likelihood of an entity accessing the web page interacting with at least one interactive element of the web page presented on an end-user client terminal accessed by an entity meeting at least one entity feature, by reducing computational load from a hardware processor calculating a set of sequential adjustments of decision rules designating variations to target entities, by reducing a number of analyzed combinations, comprising:

executing a code by at least one hardware processor of a computing device, for:

receiving, via a network, from an administrative client terminal, a set of at least one decision rule defining a distribution of a plurality of variations of at least one visual element of the GUI that includes at least one interactive element for dynamic generation of the web page for presentation on each one of a plurality of end-user client terminals, amongst a plurality of target entities associated with a plurality of target entity features using end-user client terminals accessing the web page hosted by a server;

designating each of said plurality of variations of the at least one visual element of the GUI of the web page that includes the at least one interactive element to a respective cluster of target entities that are compliant with at least one defined target entity feature of said plurality of target entity features, according to the set of at least one decision rule;

collecting, via a network, a plurality of indications each indicative of whether or not members each of the target entities of the respective cluster interacted with the at least one interactive element of the GUI of the web page presented on respective end-user client terminals based on designation of the plurality of variations by execution of the at least one received decision rule;

calculating, for a reduced set of combinations of a total number of possible combinations of variations of the at least one visual element of the GUI of the web page and target entities, at least one performance outcome based on an analysis of the collected plurality of indications indication of whether or not members each of the target entities interacted with the at least one interactive element of the GUI of the web page presented on respective end-user client terminals, wherein the at least one performance outcome is indicative of probability of the respective target entity defined by the set of at least one decision rule interacting with the at least one interactive element of the GUI of the web page;

calculating at least one sequential adjustment of the received set of at least one decision rule, wherein the sequential adjustment is based on at least one target entity feature, and wherein each sequential adjustment is computed according to an analysis of a predicted performance outcome indicative of respective target entities interacting with the at least one interactive element calculated based on assigning at least one other one of the plurality of variations to respective target entities according to an adjusted set of decision rules, and wherein each sequential adjustment includes at least one alternative decision rule designating at least one alternative variation of the at least one visual element of the GUI of the web page that includes the at least one interactive element to a respective cluster of target entities that are compliant with at least one entity feature;

generating an administrative presentation comprising a graphic user interface (GUI) presenting a predefined number of recommendations for selecting one recommendation with a single click, the recommendations presented in the GUI for implementing in response to the single click, at least one of: (i) the at least one sequential adjustment for assigning the at least one of the other plurality of variations of the at least one visual element of the GUI of the web page that includes the at least one interactive element to respective target entities according to the adjusted set of decision rules for obtaining at least one performance outcome therefrom, and (ii) the at least one alternative variation of the at least one visual element of the GUI of the web that includes the at least one interactive element to a respective cluster of target entities that are compliant with at least one entity feature for obtaining at least one performance outcome therefrom;

receiving, via the network, the single click indicative of a selection of a recommendation of the presented predefined number of recommendations, said selection is of one of a first type of selection and a second type of selection;

upon identification of said first type of selection, iterating said designating, said calculating for the reduced set of combination, said calculating at least one sequential adjustment, calculating said at least one sequential adjustment, said generating and said presenting based on the selected recommendation, wherein during each iteration, each respective sequential adjustment includes a sequentially increasing number of target entity features that include all target entity features of a previous decision rule in the sequence, and one or more additional target entity feature not included in the previous decision rules in the sequence with fewer number of target entity features, and another alternative decision rule, wherein the presented recommendations of the at least one sequential adjustment includes the at least one target entity feature with which the cluster of target entities defined by the at least one sequential adjustment is compliant, and at least one alternative decision rule including at least one variation designated to respective clusters of target entities; and upon identification of said second type of selection, automatically dynamically generating the GUI of the web page hosted by the server that includes the at least one visual element according to the selected recommendation and, for presentation on an end-user client terminal accessing the web page hosted by the server by a respective entity meeting the at least one target entity feature, for increasing likelihood of the respective entity interacting with the at least one interactive element of the dynamically generated GUI of the web page.

2. The method according to claim 1, wherein each at least one sequential adjustment is associated with at least one possible variation for designation to the cluster of target entities.

3. The method according to claim 2, wherein each at least one sequential adjustment further comprises an additional subset of variations for designation to target entities that are excluded from the cluster.

4. The method according to claim 1, wherein a single variation is randomly selected according to a probability distribution from the plurality of variations for designation to each member of the cluster of target entities.

5. The method of claim 1, wherein the at least one sequential adjustment is presented as at least one natural language recommendation.

6. The method of claim 5, wherein the at least one natural language recommendation is played as audio by a speaker of the client terminal.

7. The method of claim 5, wherein the at least one natural language recommendation is presented as text.

8. The method of claim 7, wherein the text is transmitted to the display of the client terminal using a member selected from the group consisting of: an email, a short message service (SMS), and a push message.

9. The method of claim 1, wherein the analysis of the predicted performance outcome is performed by computing the probability, for each possible cluster of target users complying with one respective additional target entity feature of a plurality of target entity features including arbitrary target entity features, performing the action associated with each respective variation of the plurality of variations.

10. The method of claim 9, wherein the following relationship is used to compute the probability of the action performed for each possible cluster of target users complying with the one respective additional target entity feature:

CTR(UI, UP)~Beta(1+actions(UI, UP), 1+(imps(UI, UP)−actions(UI, UP)))

wherein:
CTR denotes the probability of the action of the variation being performed,
UI denotes the respective variation,
UP denotes the respective one additional target entity feature,
Beta denotes a beta distribution function,
Actions denotes the number of actions of the variation performed, and
Imps denotes the number of times the certain variation is assigned.

11. The method of claim 9, wherein the analysis further comprises identifying, according to a requirement defining the highest computed probability, the one respective additional target entity feature defining the at least one other cluster of target entities to assign to the certain variation.

12. The method of claim 1, wherein said iterating comprising:
designating, according to the selection, each of the plurality of variations to respective cluster of target entities that are compliant with the target entity features defined by the selected sequential adjustment and according to the at least one alternative decision rule;
calculating at least one sub-sequential adjustment of the selected sequential adjustment, wherein the sub-sequential adjustment is based on at least one additional target entity feature, and wherein each sub-sequential adjustment is computed according to an analysis of the predicted performance outcome calculated based on assigning at least one of the plurality of variations to respective target entities according to the selected sequential adjustment, and wherein each sub-sequential adjustment includes at least one alternative decision rule designating at least one variation to a respective cluster of target entities that are compliant with at least one additional entity feature; and
presenting, within a UI of the client terminal, the at least one sub-sequential adjustment, wherein the presented at least one sub-sequential adjustment includes the at least one additional target entity feature with which the cluster of target entities defined by the at least one sub-sequential adjustment is compliant, and at least one alternative decision rule including at least one variation designated to respective clusters of target entities.

13. The method of claim 12, wherein the iteration is performed in response to a single click by the user of the client terminal.

14. The method of claim 1, wherein the plurality of variations are selected from the group consisting of: medical treatments for a patient, items for sale on an e-commerce site, product placement arrangements in a physical retail store, items to present to physical retail store club members, items to present to e-commerce club members, items to present in a marketing campaign held using email or physical mail, items with a deep discount to new customers, an amount of the deep discount, travel destinations, visit itinerary, students for placement in two or more schools.

15. The method of claim 1, wherein the designation of each of the plurality of variation to the respective cluster of target entities is performed according to a pre-set probability distribution.

16. The method of claim 1, further comprising computing for each of the at least one sequential adjustments, an associated quality assessment score, wherein the quality assessment score provides a basis of comparison between sequential adjustments of different levels.

17. The method of claim 16, wherein the quality assessment score is computed by performing:
computing at least one of: an uplift value, and a probability of positive uplift, for each of the at least one sequential adjustment, wherein the at least one of uplift value and probability of positive uplift are computed based on the probability of the respective target entities of the at least one sequential adjustment performing the action associated with the variation of the at least one sequential adjustment relative to a certain target entity of the respective cluster of target entities defined by the at least one alternative decision rule performing the action associated with the variation of the at least one alternative decision rule; and
further comprising presenting within the UI of the client terminal, the computed at least one of: uplift value, and probability of positive uplift, associated with the at least one sequential adjustment.

18. The method of claim 17, wherein the uplift value is computed according to the following relationships:
Uplift=100 ×(−1+f/KPI($\Omega$v, $\Omega$p)),
Action=f−KPI($\Omega$v, $\Omega$p),
f=P(Sp)×KPI(Sv,Sp)+P(cSp)×KPI(Svr,cSp), wherein:
Uplift denotes the uplift of the respective sequential adjustment,
Action denotes the KPI gain from the target entity of the respective cluster of target entities complying with the at least one target entity feature performing the action associated with the designated variation,
f denotes the probability of the action of the variation being performed by an arbitrary target entity on an arbitrary variations,
$\Omega$v denotes the plurality of variations,
$\Omega$p denotes the set of possible target entity features of the target entities,
Sv denotes the subset of $\Omega$v that is assigned to target entities complying with at least one target entity feature,
Svr denotes the subset of $\Omega$v that is assigned to target entities that do not comply with the at least one target entity feature,
Sp denotes the subset of $\Omega$p, of the target entities assigned to Sv, c denotes the complement of,
KPI denotes the rate of performing the actions per target entity accessing the variation of the designated variation, and
P denotes the proportion in the population of target entities.

19. The method of claim 16, further comprising:
ranking the at least one sequential adjustment according to the quality assessment score computed for each sequential adjustment;
selecting the highest ranked subset of ranked sequential adjustments according to a requirement; and
presenting within the UI of the client terminal, the highest ranked subset of ranked sequential adjustments.

20. The method of claim 1, wherein each target entity feature of the at least one target entity feature is defined as a categorical variable.

21. The method of claim 1, wherein the at least one target entity features are selected from the group consisting of: gender, age, geographic location, demographic parameter, historical purchasing habits, type of device used to access the web page, how web page was reached.

22. The method of claim 1, wherein the plurality of variations include a control variation and a variable variation evaluated as an A/B trial.

23. The method of claim 1, wherein the computing the at least one sequential adjustment is performed when a sufficient number of variations are assigned such that the analysis of the at least one performance outcome provides a statistical significance of the at least one sequential adjustment according to a requirement.

24. The method of claim 1, wherein the analysis of the predicted performance outcome is performed using a set of values denoting, for each variation, the total number of target entities having a certain combination of target entity features accessing the respective variation and the total number of actions performed.

25. The method of claim 1, wherein variations of the plurality of variations differ from each other in at least one member selected from the group consisting of: an image of the GUI of the web page, location of the image in the GUI of the web page, text of the GUI of the web page, location of the text in the GUI of the web page, color of the GUI of the web page, sound played with the GUI of the web page, available help accessed from the GUI of the web page, and layout of the GUI of the web page.

26. The method of claim 1, wherein the interaction with at least one interactive element of the GUI of the web page is selected from the group consisting of: clicking an interactive element, clicking a link, clicking an image, clicking an advertisement, filling out a form, clicking an interactive element to make a call to a defined phone number, clicking an interactive element for sending a message to a predefined network address, clicking an interactive element for participating in a predefined chat, and clicking an interactive element for making a purchase.

27. The method of claim 1, wherein a number of target entity features defining the cluster for receiving the content variation of the respective sequential adjustment denote a level, with increasing number of entity features, wherein level 0 denotes selection of an entire population of target entities when selection is based on zero entity features, level 1 denotes selection based on a single entity feature, and level 2 denotes selection based on the level 1 feature and one additional feature.

28. The method of claim 1, wherein highest probabilities associated with a respective target entity feature defining the cluster of target entities and the associated content variation are identified and used to generate a successive recommendation in the sequence.

29. A system for dynamic generation of a graphical user interface (GUI) of a web page for increasing likelihood of an entity accessing the web page interacting with at least one interactive element of the web page presented on an end-user client terminal accessed by an entity meeting at least one entity feature, by reducing computational load from a hardware processor calculating a set of sequential adjustments of decision rules designating variations to target entities, by reducing a number of analyzed combinations, comprising:
a non-transitory memory having stored thereon a code for execution by at least one hardware processor of a computing device, the code comprising:
code for receiving, via a network, from an administrative client terminal, a set of at least one decision rule defining a distribution of a plurality of variations of at least one visual element of the GUI that includes at least one interactive element for dynamic generation of the web page for presentation on each one of a plurality of end-user client terminals amongst a plurality of target entities associated with a plurality of target entities using end-user client terminals accessing the web page hosted by a server;
code for designating each of said plurality of variations of the at least one visual element of the GUI of the web page that includes the at least one interactive element to a respective cluster of target entities that are compliant with at least one defined target entity feature of said plurality of target entity features, according to the set of at least one decision rule;
code for collecting, via a network, a plurality of indications each indicative of whether or not members each of the target entities of the respective cluster interacted with the at least one interactive element of the GUI of the web page presented on respective end-user client terminals based on designation of the plurality of variations by execution of the at least one received decision rule;
code for calculating, for a reduced set of combinations of a total number of possible combinations of variations of the at least one visual element of the GUI of the web page and target entities, at least one performance outcome based on an analysis of the collected plurality of indications indication of whether or not members each of the target entities interacted with the at least one interactive element of the GUI of the web page presented on respective end-user client terminals,
wherein the at least one performance outcome is indicative of probability of the respective target entity defined by the set of at least one decision rule interacting with the at least one interactive element of the GUI of the web page;
code for calculating at least one sequential adjustment of the received set of at least one decision rule, wherein the sequential adjustment is based on at least one target entity feature, and wherein each sequential adjustment is computed according to an analysis of a predicted performance outcome indicative of respective target entities interacting with the at least one interactive element calculated based on assigning at least one other one of the plurality of variations to respective target entities according to an adjusted set of decision rules, and wherein each sequential adjustment includes at least one alternative decision rule designating at least one alternative variation of the at least one visual element of the GUI of the web that includes the at least one interactive element to a respective cluster of target entities that are compliant with at least one entity feature;

code for generating an administrative presentation comprising a graphic user interface (GUI) presenting a predefined number of recommendations for selecting one recommendation with a single click, the recommendations presented in the GUI for implementing in response to the single click, at least one of: (i) the at least one sequential adjustment for assigning the at least one of the other plurality of variations of the at least one visual element of the GUI of the web page that includes the at least one interactive element to respective target entities according to the adjusted set of decision rules for obtaining at least one performance outcome therefrom, and (ii) the at least one alternative variation of the at least one visual element of the GUI of the web that includes the at least one interactive element to a respective cluster of target entities that are compliant with at least one entity feature for obtaining at least one performance outcome therefrom;

code for receiving, via the network, the single click indicative of a selection of a recommendation of the presented predefined number of recommendations, said selection is of one of a first type of selection and a second type of selection;

code for iterating said designating, said calculating for the reduced set of combination, said calculating at least one sequential adjustment, calculating said at least one sequential adjustment, said generating and said presenting based on the selected recommendation, upon identification of said first type of selection, wherein during each iteration, each respective sequential adjustment includes a sequentially increasing number of target entity features that include all target entity features of a previous decision rule in the sequence, and one or more additional target entity feature not included in the previous decision rules in the sequence with fewer number of target entity features, and another alternative decision rule, wherein the presented recommendations of the at least one sequential adjustment includes the at least one target entity feature with which the cluster of target entities defined by the at least one sequential adjustment is compliant, and at least one alternative decision rule including at least one variation designated to respective clusters of target entities; and code for, upon identification of said second type of selection, automatically dynamically generating the GUI of the web page hosted by the server that includes the at least one visual element according to the selected recommendation and, for presentation on an end-user client terminal accessing the web page hosted by the server by a respective entity meeting the at least one target entity feature, for increasing likelihood of the respective entity interacting with the at least one interactive element of the dynamically generated GUI of the web page.

30. The system of claim 29, wherein the plurality of variations are hosted by a server in network communication with the computing device and the client terminal, wherein the target user uses another client terminal to access the assigned variation.

31. A computer program product for dynamic generation of a graphical user interface (GUI) of a web page for increasing likelihood of an entity accessing the web page interacting with at least one interactive element of the web page presented on an end-user client terminal accessed by an entity meeting at least one entity feature, by reducing computation load from a hardware processor calculating a set of sequential adjustments of decision rules designating variations to target entities, by reducing a number of analyzed combinations, comprising:

instructions for receiving, via a network, from an administrative client terminal, a set of at least one decision rule defining a distribution of a plurality of variations at least one visual element of the GUI that includes at least one interactive element for dynamic generation of the web page for presentation on each one of a plurality of end-user client terminals, amongst a plurality of target entities associated with a plurality of target entity features using end-user client terminal accessing the web page hosted by a server;

instructions for designating each of said plurality of variations of the at least one visual element of the GUI of the web page that includes the at least one interactive element to a respective cluster of target entities that are compliant with at least one defined target entity feature of said plurality of target entity features, according to the set of at least one decision rule;

instructions for collecting, via a network, a plurality of indications each indicative of whether or not members each of the target entities of the respective cluster interacted with the at least one interactive element of the GUI of the web page presented on respective end-user client terminals based on designation of the plurality of variations by execution of the at least one received decision rule;

instructions for calculating, for a reduced set of combinations of a total number of possible combinations of variations of the at least one visual element of the GUI of the web page and target entities, at least one performance outcome based on an analysis of the collected plurality of indications indication of whether or not members each of the target entities interacted with the at least one interactive element of the GUI of the web page presented on respective end-user client terminals, wherein the at least one performance outcome is indicative of probability of the respective target entity defined by the set of at least one decision rule interacting with the at least one interactive element of the GUI of the web page;

instructions for calculating at least one sequential adjustment of the received set of at least one decision rule, wherein the sequential adjustment is based on at least one target entity feature, and wherein each sequential adjustment is computed according to an analysis of a predicted performance outcome indicative of respective target entities interacting with the at least one interactive element calculated based on assigning at least one other one of the plurality of variations to respective target entities according to an adjusted set of decision rules, and wherein each sequential adjustment includes at least one alternative decision rule designating at least one alternative variation of the at least one visual element of the GUI of the web that includes the at least one interactive element to a respective cluster of target entities that are compliant with at least one entity feature;

instructions for generating an administrative presentation comprising a graphic user interface (GUI) presenting a predefined number of recommendations for selecting one recommendation with a single click, the recommendations presented in the GUI for implementing in response to the single click, at least one of: (i) the at least one sequential adjustment for assigning the at least one of the other plurality of variations of the at least one visual element of the GUI of the web page that includes the at least one interactive element to respective target entities according to the adjusted set of decision rules for obtaining at least one performance outcome therefrom, and (ii) the at least one alternative variation of the at least one visual element of the GUI of the web that includes the at least one interactive element to a respective cluster of target entities that are compliant with at least one entity feature for obtaining at least one performance outcome therefrom;

instructions for receiving, via the network, the single click indicative of a selection of a recommendation of the presented predefined number of recommendations, said selection is of one of a first type of selection and a second type of selection;

instructions for iterating said designating, said calculating for the reduced set of combination, said calculating at least one sequential adjustment, calculating said at least one sequential adjustment, said generating and said presenting based on the selected recommendation, upon identification of said first type of selection, wherein during each iteration, each respective sequential adjustment includes a sequentially increasing number of target entity features that include all target entity features of a previous decision rule in the sequence, and one or more additional target entity feature not included in the previous decision rules in the sequence with fewer number of target entity features, and another alternative decision rule, wherein the presented recommendations of the at least one sequential adjustment includes the at least one target entity feature with which the cluster of target entities defined by the at least one sequential adjustment is compliant, and at least one alternative decision rule including at least one variation designated to respective clusters of target entities; and instructions for, upon identification of said second type of selection, automatically dynamically generating the GUI of the web page hosted by the server that includes the at least one visual element according to the selected recommendation and, for presentation on an end-user client terminal accessing the web page hosted by the server by a respective entity meeting the at least one target entity feature, for increasing likelihood of the respective entity interacting with the at least one interactive element of the dynamically generated GUI of the web page.

* * * * *